US009528648B2

(12) United States Patent
Nanaji

(10) Patent No.: US 9,528,648 B2
(45) Date of Patent: Dec. 27, 2016

(54) BREAKAWAY ASSEMBLY WITH RELIEF VALVE

(71) Applicant: Seifollah S. Nanaji, Clarksville, MD (US)

(72) Inventor: Seifollah S. Nanaji, Clarksville, MD (US)

(73) Assignee: OPW FUELING COMPONENTS INC., Hamilton, OH (US)

( * ) Notice: Subject to any disclaimer, the term of this patent is extended or adjusted under 35 U.S.C. 154(b) by 48 days.

(21) Appl. No.: 14/181,937

(22) Filed: Feb. 17, 2014

(65) Prior Publication Data

US 2014/0311579 A1     Oct. 23, 2014

Related U.S. Application Data

(60) Provisional application No. 61/788,778, filed on Mar. 15, 2013.

(51) Int. Cl.
*F16L 37/32*     (2006.01)
*F16L 37/113*     (2006.01)
(Continued)

(52) U.S. Cl.
CPC ............ *F16L 37/32* (2013.01); *B67D 7/3218* (2013.01); *F16L 37/113* (2013.01);
(Continued)

(58) Field of Classification Search
CPC ............ F16L 29/00; F16L 29/02; F16L 29/04; F16L 37/32; F16L 37/34; F16L 37/36; F16L 37/38; F16L 37/40; F16L 37/44; F16L 55/1015; F16L 37/113; B67D 7/3218
(Continued)

(56) References Cited

U.S. PATENT DOCUMENTS 2,793,057 A    5/1957   McGugin
2,912,263 A    11/1959   Christy
(Continued)

FOREIGN PATENT DOCUMENTS

DE     6813701     7/1970
EP     1628065     2/2006
(Continued)

OTHER PUBLICATIONS

PCT, International Search Report and Written Opinion, PCT/US2014/020534 (Aug. 28, 2014).
(Continued)

*Primary Examiner* — Kevin Lee
(74) *Attorney, Agent, or Firm* — Thompson Hine LLP

(57) ABSTRACT

A breakaway assembly including a first connector and a second connector that is releasably coupleable to the first connector. The assembly is movable between a first configuration in which the first and second connectors are coupled and together define a fluid path through which fluid is flowable, and a second configuration in which the first and second connectors are axially separated. The assembly is configured to move from the first configuration to the second configuration when a sufficient separation force is applied to the assembly, and to be moved from the second configuration to the first configuration when a sufficient connecting force is applied to the assembly. The assembly includes a closure valve positioned in one of the first or second connectors, wherein the closure valve is configured to be in an open position when the assembly is in the first configuration to allow fluid to flow therethrough, and to be in a closed position when the assembly is in the second configuration to generally block the flow of fluid therethrough. The assembly further includes a bleed valve configured to allow
(Continued)

at least some fluid trapped by the closure valve to escape to reduce a pressure of the fluid trapped by the closure valve.

30 Claims, 18 Drawing Sheets

(51) Int. Cl.
  *F16L 55/10* (2006.01)
  *B67D 7/32* (2010.01)
(52) U.S. Cl.
  CPC ....... *F16L 55/1015* (2013.01); *F16L 2201/10* (2013.01); *F16L 2201/60* (2013.01); *Y10T 137/0324* (2015.04); *Y10T 137/7723* (2015.04)
(58) Field of Classification Search
  USPC .... 137/614, 614.03–614.05, 614.16–614.18; 251/149.1, 149.6
  See application file for complete search history.

(56) References Cited

U.S. PATENT DOCUMENTS

| | | | |
|---|---|---|---|
| 2,951,713 | A | 9/1960 | Hoffstrom |
| 3,104,088 | A | 9/1963 | Cator |
| 3,181,895 | A | 5/1965 | Cator |
| 3,317,220 | A | 5/1967 | Bruning |
| 3,520,331 | A | 7/1970 | Locke et al. |
| 3,570,543 | A | 3/1971 | Ekman |
| 3,586,048 | A | 6/1971 | Arnold |
| 3,715,099 | A | 2/1973 | Shendure |
| 4,049,295 | A | 9/1977 | Piers |
| 4,060,110 | A | 11/1977 | Bower |
| 4,240,466 | A * | 12/1980 | Herzan et al. ........ B62D 49/065 137/614.04 |
| 4,262,712 | A | 4/1981 | Young |
| 4,331,190 | A | 5/1982 | Sutcliffe et al. |
| D268,612 | S | 4/1983 | Sutcliffe |
| 4,397,447 | A | 8/1983 | Fink, Jr. |
| 4,559,982 | A | 12/1985 | Fink, Jr. |
| 4,596,278 | A | 6/1986 | Fink, Jr. |
| 4,615,547 | A | 10/1986 | Sutcliffe et al. |
| 4,658,987 | A | 4/1987 | Fink, Jr. |
| 4,667,883 | A | 5/1987 | Fink, Jr. |
| 4,691,941 | A | 9/1987 | Rabushka et al. |
| 4,763,683 | A | 8/1988 | Carmack |
| 4,809,753 | A | 3/1989 | Fink, Jr. |
| 4,825,916 | A | 5/1989 | Fink, Jr. |
| 4,827,977 | A | 5/1989 | Fink, Jr. |
| 4,828,183 | A | 5/1989 | Fink, Jr. |
| 4,905,733 | A | 3/1990 | Carow |
| 4,993,460 | A | 2/1991 | Robinson et al. |
| 5,085,258 | A | 2/1992 | Fink, Jr. et al. |
| 5,096,230 | A | 3/1992 | Pausch et al. |
| 5,099,870 | A * | 3/1992 | Moore et al. ........ B67D 7/3218 137/493.3 |
| 5,127,451 | A | 7/1992 | Fink, Jr. et al. |
| 5,165,439 | A | 11/1992 | Krynicki |
| 5,197,523 | A | 3/1993 | Fink, Jr. et al. |
| 5,263,511 | A | 11/1993 | Ohasi |
| 5,285,807 | A | 2/1994 | Nitzberg |
| 5,365,972 | A * | 11/1994 | Smith, III ............. 137/614.04 |
| 5,365,973 | A | 11/1994 | Fink, Jr. et al. |
| 5,394,909 | A | 3/1995 | Mitchell et al. |
| 5,419,354 | A | 5/1995 | Krynicki |
| 5,425,529 | A * | 6/1995 | West ................. 251/335.2 |
| 5,433,247 | A | 7/1995 | Guertin |
| 5,454,394 | A * | 10/1995 | Moore et al. ............ 137/71 |
| 5,464,041 | A | 11/1995 | Reinicke |
| 5,474,115 | A | 12/1995 | Fink, Jr. |
| 5,476,125 | A | 12/1995 | Mitchell |
| 5,482,094 | A | 1/1996 | Mitchell |
| 5,520,228 | A | 5/1996 | Fink, Jr. et al. |
| 5,522,440 | A | 6/1996 | Mitchell |
| 5,564,471 | A | 10/1996 | Wilder et al. |
| 5,609,298 | A | 3/1997 | Hyslop |
| 5,695,221 | A | 12/1997 | Sunderhaus |
| 5,957,157 | A | 9/1999 | Mitchell et al. |
| 5,967,385 | A | 10/1999 | Coates, III |
| 6,050,297 | A | 4/2000 | Ostrowski et al. |
| 6,182,695 | B1 | 2/2001 | Coates, III et al. |
| 6,192,934 | B1 | 2/2001 | Coates, III et al. |
| 6,283,151 | B1 | 9/2001 | Countryman et al. |
| 6,334,474 | B1 | 1/2002 | Rababy et al. |
| 6,397,903 | B1 | 6/2002 | Coates, III et al. |
| 6,491,282 | B2 | 12/2002 | Fink, Jr. |
| 6,550,817 | B1 | 4/2003 | Mitchell |
| 6,585,014 | B1 | 7/2003 | Fink, Jr. |
| 6,634,395 | B1 | 10/2003 | Mitchell |
| 6,676,029 | B2 | 1/2004 | Mitchell |
| 6,866,299 | B2 | 3/2005 | Coates |
| 6,899,131 | B1 | 5/2005 | Carmack et al. |
| 6,973,938 | B2 | 12/2005 | Mitchell |
| 7,000,651 | B2 | 2/2006 | Fink, Jr. et al. |
| 7,011,119 | B2 | 3/2006 | Fink, Jr. |
| 7,063,112 | B2 | 6/2006 | Fink, Jr. et al. |
| 7,165,576 | B2 | 1/2007 | Carmack et al. |
| 7,252,112 | B1 | 8/2007 | Imler et al. |
| 7,406,988 | B2 | 8/2008 | Mitchell |
| 7,487,796 | B2 | 2/2009 | Imler et al. |
| 7,575,023 | B2 | 8/2009 | Fraser |
| 7,578,872 | B2 | 8/2009 | Fink, Jr. |
| 7,748,419 | B2 | 7/2010 | Fink, Jr. et al. |
| 7,753,079 | B2 | 7/2010 | Nelson |
| 7,793,987 | B1 | 9/2010 | Busch et al. |
| D626,600 | S | 11/2010 | Brown |
| 7,891,637 | B2 | 2/2011 | Zimmermann et al. |
| 8,075,677 | B2 | 12/2011 | Schroeder et al. |
| 8,186,084 | B2 | 5/2012 | Brown |
| 8,251,084 | B2 | 8/2012 | Brown |
| 8,689,828 | B2 * | 4/2014 | Smith, III ............. 137/614.17 |
| 2005/0263193 | A1 | 12/2005 | Carmack et al. |
| 2006/0049629 | A1 | 3/2006 | Naumann et al. |
| 2007/0277887 | A1 | 12/2007 | Imler et al. |
| 2011/0084474 | A1 | 4/2011 | Paden et al. |
| 2013/0276923 | A1 | 10/2013 | Wolff et al. |

FOREIGN PATENT DOCUMENTS

| | | |
|---|---|---|
| FR | 1466542 | 12/1965 |
| GB | 622632 | 5/1949 |
| JP | 05-079584 | 3/1993 |
| JP | 7-2695 | 1/1995 |
| KR | 1996-0010293 | 7/1996 |
| KR | 2001-0043854 | 5/2001 |
| SU | 626301 | 9/1978 |
| WO | 90/04097 | 4/1990 |
| WO | 99/61780 | 12/1999 |

OTHER PUBLICATIONS

One-line catalog featuring "Catlow ¾" Cam Twist Vac Assist Magnetic Breakaway," by Oil Equipment Company Inc. http://www.oilequipment.com/products/catlow-34-cam-twist-vac-assist-magnetic-breakaway (retrieved from the internet on Oct. 31, 2012).
MB Magbreak by Husky (Sep. 2012).

* cited by examiner

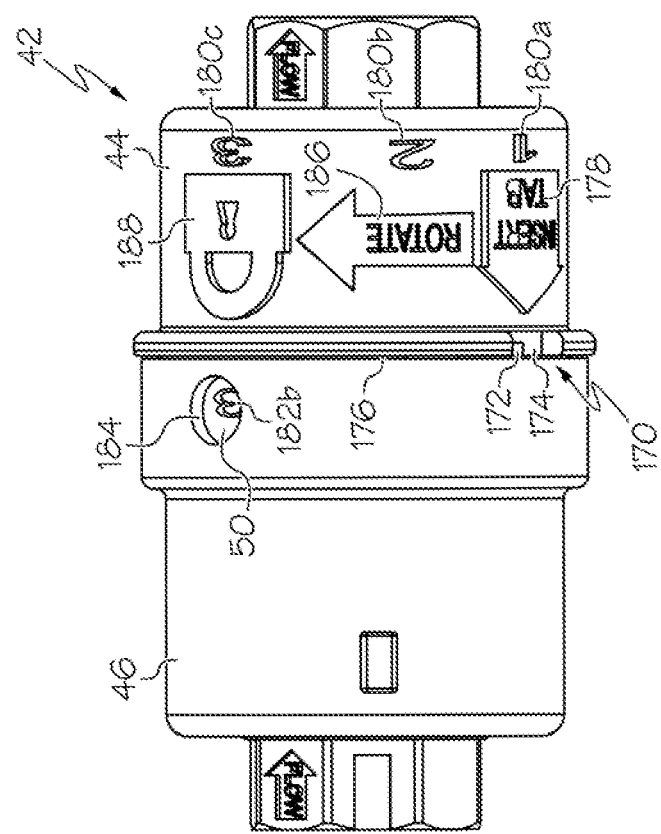

BREAKAWAY ASSEMBLY WITH RELIEF VALVE

This application claims priority to U.S. Provisional Application Ser. No. 61/788,778, filed on Mar. 15, 2013, the entire contents of which are hereby incorporated by reference.

The present invention is directed to a breakaway assembly for use in a fluid dispensing system.

BACKGROUND

Breakaway connectors or assemblies can be utilized in fluid dispensing systems, such as gasoline refueling stations and the like. The breakaway assemblies are designed to provide a break in the fluid system, which can then be sealed/closed, when a sufficient breakaway force is applied thereto. For example, in a drive-away event, the user of a refueling unit may inadvertently leave the nozzle in the vehicle tank and drive away. Breakaway assemblies are designed to provide a breakaway point at which the hose or system can be separated, and also provide a closing valve to prevent or minimize loss of fuel. However, many current breakaway assemblies can be difficult to connect/reconnect.

SUMMARY

In one embodiment, the present invention is a breakaway assembly which includes a relief or bleed valve to provide ease of connection/reconnection. More particularly, in one embodiment, the invention is a breakaway assembly including a first connector and a second connector that is releasably coupleable to the first connector. The assembly is movable between a first configuration in which the first and second connectors are coupled and together define a fluid path through which fluid is flowable, and a second configuration in which the first and second connectors are axially separated. The assembly is configured to move from the first configuration to the second configuration when a sufficient separation force is applied to the assembly, and to be moved from the second configuration to the first configuration when a sufficient connecting force is applied to the assembly. The assembly includes a closure valve positioned in one of the first or second connectors, wherein the closure valve is configured to be in an open position when the assembly is in the first configuration to allow fluid to flow therethrough, and to be in a closed position when the assembly is in the second configuration to generally block the flow of fluid therethrough. The assembly further includes a bleed valve configured to allow at least some fluid trapped by the closure valve to escape to reduce a pressure of the fluid trapped by the closure valve.

In another embodiment, the invention is a connection system for a breakaway assembly that provides indicia to aid a user in connection/reconnection. More particularly, in one embodiment the invention is a breakaway assembly including a first connector and a second connector that is releasably coupleable to the first connector. The assembly further includes a valve positioned in one of the first or second connectors. The assembly is configurable in first configuration in which the first and second connectors are coupled together and the valve is in an open position to allow fluid to flow therethrough, and a second configuration in which the first and second connectors are not coupled together and the valve is in a closed position to generally block to flow of fluid therethrough. The assembly is configured to move from the first configuration to the second configuration when a sufficient separation force is applied to the assembly. The assembly is configured such that in order to move the assembly from the second configuration to the first configuration at least part of one of the first or second connectors is aligned relative to the other one of the first or second connectors and then inserted into the other one of the first or second connectors, and at least one of the first or second connectors is then rotated relative to the other. At least one of the first or second connectors includes alignment indicia positioned to cue a user as to at least one of the alignment or insertion. At least one of the first or second connectors includes rotational indicia which cues a user as to the rotation.

BRIEF DESCRIPTION OF DRAWINGS

FIG. 1A is a detail view of the area indicated in FIG. 1;

FIG. 18 is a side view of the breakaway assembly of FIG. 17, in its connected configuration.

DETAILED DESCRIPTION

Figure 1:
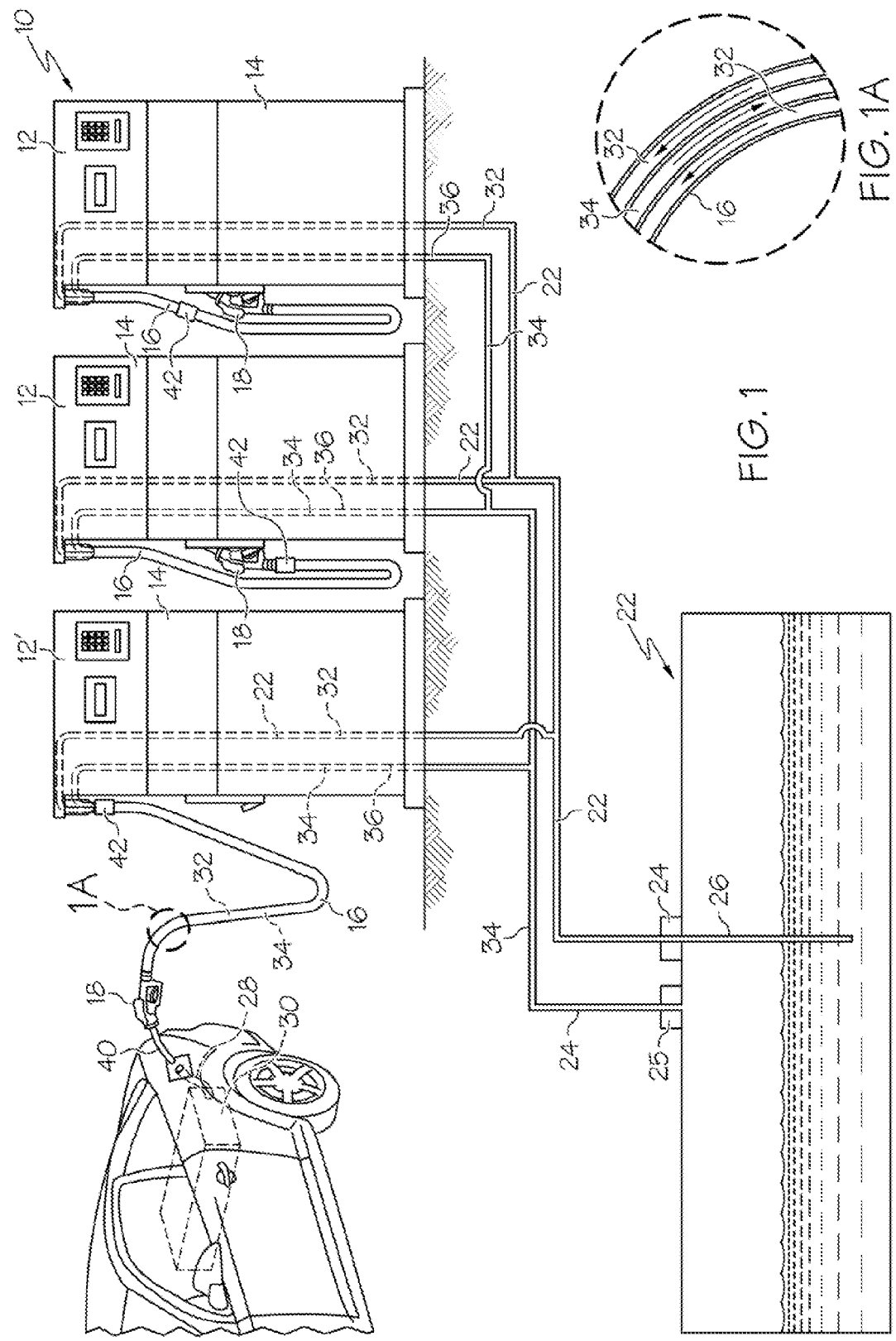
FIG. 1 is a schematic representation of a refueling system utilizing a breakaway assembly.
Figure 2:
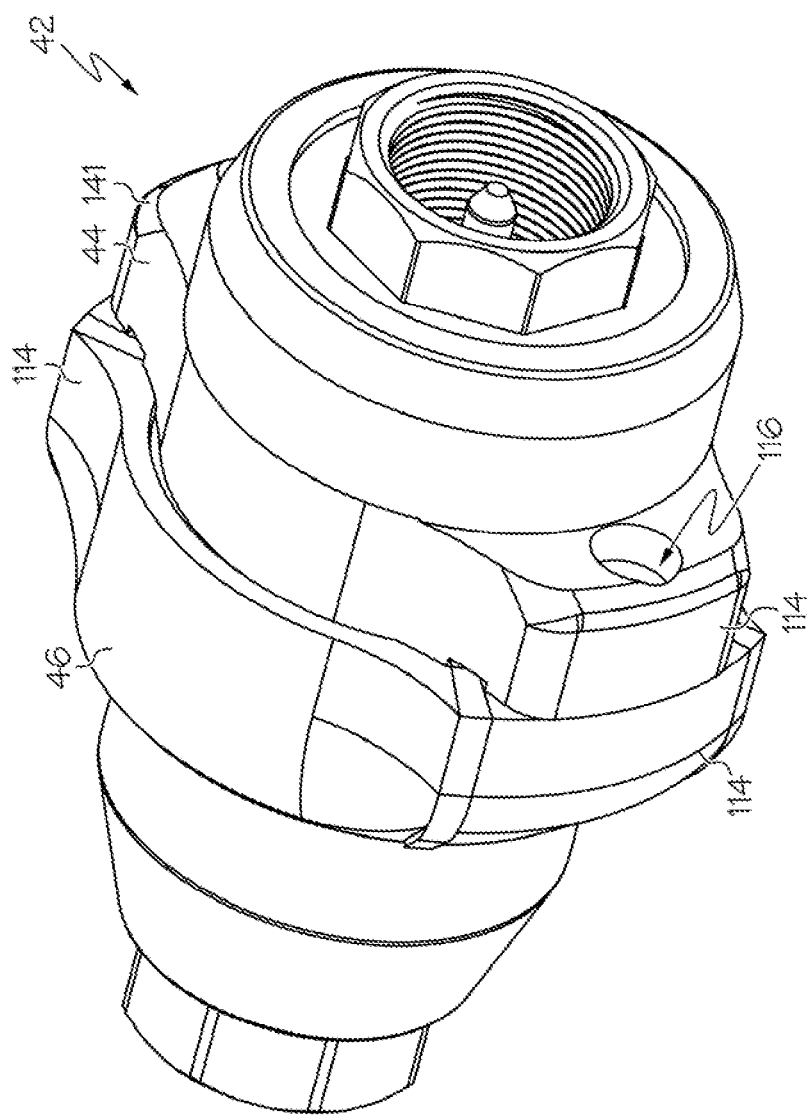
FIG. 2 is a front perspective view of one embodiment of a breakaway assembly, shown in its connected configuration.
Figure 3:
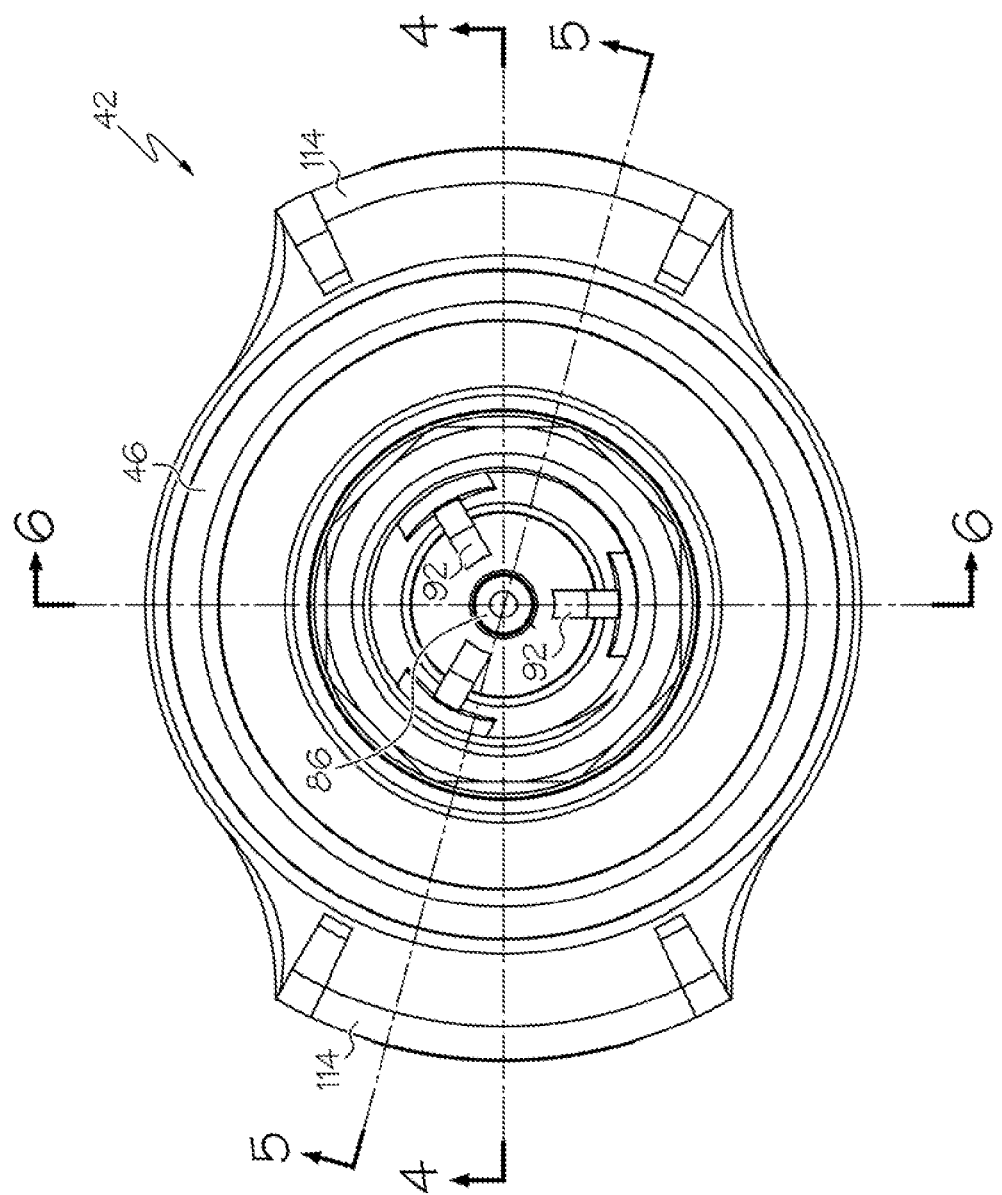
FIG. 3 is a top view of the breakaway assembly of FIG. 2.

FIG. 1 is a schematic representation of a refilling system 10 including a plurality of dispensers 12. Each dispenser 12 includes a dispenser body 14, a hose 16 coupled to the dispenser body 14, and a nozzle 18 positioned at the distal end of the hose 16. Each hose 16 may be generally flexible and pliable to allow the hose 16 and nozzle 18 to be positioned in a convenient refilling position as desired by the user/operator.

Each dispenser 12 is in fluid communication with a fuel/fluid storage tank 20 via a liquid or fluid conduit or path 22 that extends from each dispenser 12 to the storage tank 20. The storage tank 20 includes or is fluidly coupled to a fuel pump 24 which is configured to draw fluid/fuel out of the storage tank 20 via a pipe 26. During refilling, as shown by the in-use dispenser 12' of FIG. 1, the nozzle 18 is inserted into a fill pipe 28 of a vehicle fuel tank 30. The fuel pump 24 is then activated to pump fuel from the storage tank 20 to the fluid conduit 22, hose 16 and nozzle 18 and into the vehicle fuel tank 30 via a fuel or fluid path 32 of the system 10.

In some cases, the system 10 may also include a vapor path 34 extending from the nozzle 18, through the hose 16 and a vapor conduit 36 to the ullage space of the tank 20. For example, as shown in FIG. 1A, in one embodiment the vapor path 34 of the hose 16 is received in, and generally coaxial with, an outer fluid path 32 of the hose 16. The nozzle 18 may include a flexible vapor boot or bellows, sleeve or the like (not shown) of the type well known in the art which is coupled to, and circumferentially surrounds, a spout 40 of the nozzle 18.

The bellows is designed to form a seal about the spout 40 when the spout 40 is inserted into the fill pipe 28. The bellows help to capture vapors and route the vapors into the vapor path 34, although vapors can also be captured with nozzles 18 lacking a bellows. The system 10 may include a vapor recovery pump 25 which applies a suction force to the vapor path 34 to aid in vapor recovery, although in some cases (e.g. so-called "balance" systems) the vapor recovery pump 25 may be omitted. In addition, in some cases the system 10 may lack the vapor path 34, in which case the system 10 may lack the vapor conduit 36, and the hose 16 may lack the vapor path 34 therein. It should also be understood that the system 10 disclosed herein can be utilized to store/dispense any of a wide variety of fluids, liquids or fuels, including but not limited to petroleum-based fuels, such as gasoline, diesel, natural gas, biofuels, blended fuels, propane, oil or the like, or ethanol the like.

Each dispenser 12 may include a breakaway assembly 42 associated therewith, which can be located at various positions on the dispenser 12, or along the system 10. For example, the left-most dispenser 12' of FIG. 1 utilizes a breakaway assembly 42 at the base end of the hose 16; the middle dispenser 12 of FIG. 1 utilizes a breakaway assembly 42 positioned adjacent to the nozzle 18; and the right-most dispenser 12 of FIG. 1 utilizes a breakaway assembly or assembly 42 at a middle position of the hose 16. However, it should be understood that the breakaway assembly 42 can be positioned at any of a wide variety of positions along the length of the hose 16, or at other positions in the refueling system 10. The breakaway assembly 42 may include, and/or be coupled to, a swivel assembly to enable the breakaway assembly 42 to assume various positions and become aligned with any separation forces applied thereto.

As shown in FIGS. 2-12, one embodiment of the breakaway assembly 42 includes a first connector 44 releasably connected to a second connector 46. The breakaway assembly 42 and connectors 44, 46, may be generally annular. The second connector 46 may be connected to an upstream portion of the system 10/hose 16, and the first connector 44 may be connected to a downstream portion of the system 10/hose 16 (it should be understood that terms used in relation to the direction of flow, such as "upstream" and "downstream," are used herein with respect to the direction of the flow of fluids/fuel to be dispersed (i.e. left-to-right in FIGS. 4-6, 8 and 11-18), as opposed to the direction of vapor flow, unless specified otherwise). However, if desired this orientation may be reversed such that second connector 46 is connected to a downstream component, and the first connector 44 connected to an upstream component. Both the second connector 46 and first connector 44 can include threaded surfaces (such as threaded surface 48 of the second connector 46 shown in FIGS. 4-6, 8, and 11-13 and threaded surface 48 of the first connector 44 shown in FIG. 13) for securing the connectors 44, 46 to the associated upstream and downstream components. The threaded surfaces could be internally or externally threaded surfaces, or various other coupling structures besides threaded attachments may be used.

Figure 4:
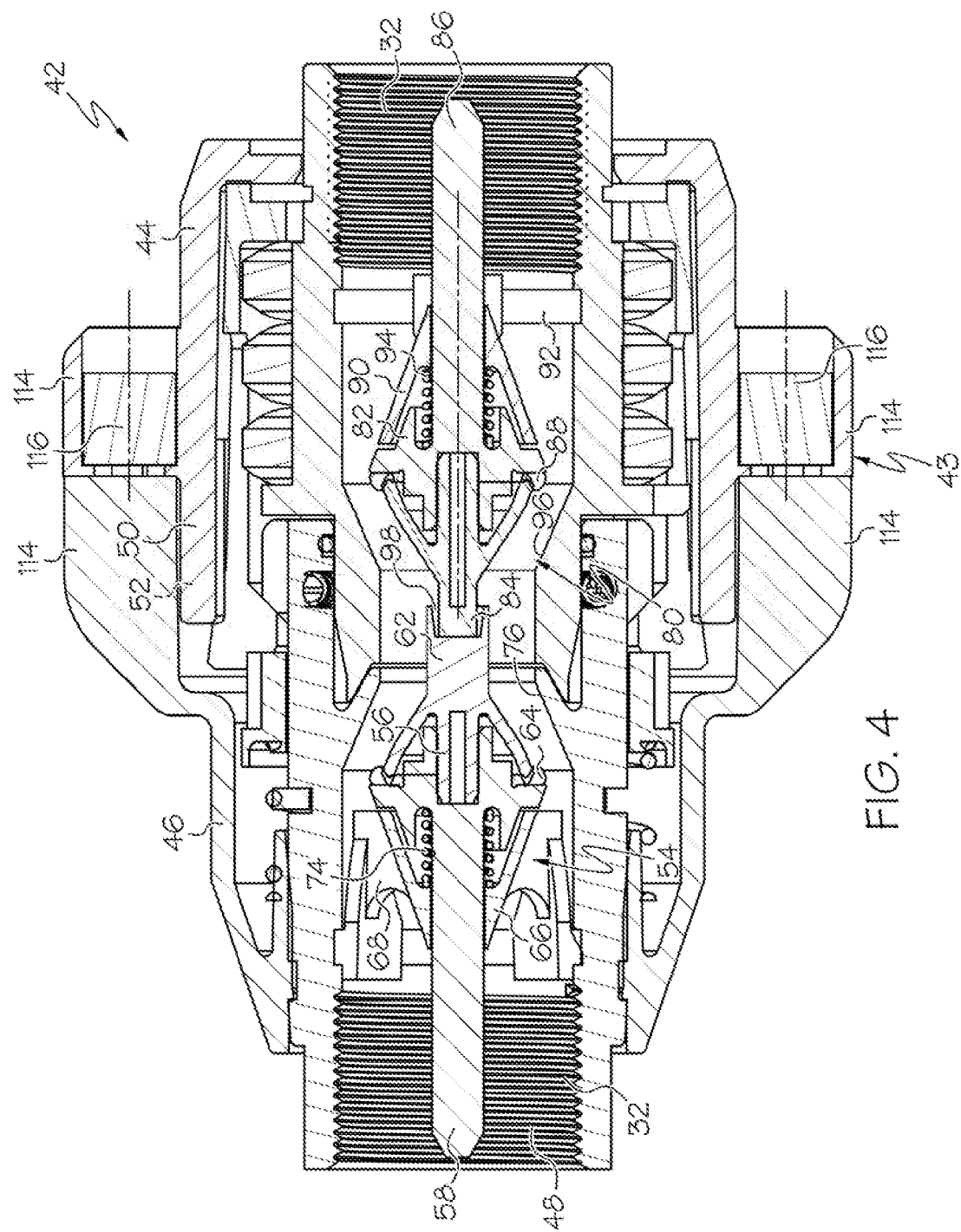
FIG. 4 is a side cross section taken along line 4-4 of FIG. 3.
Figure 7:
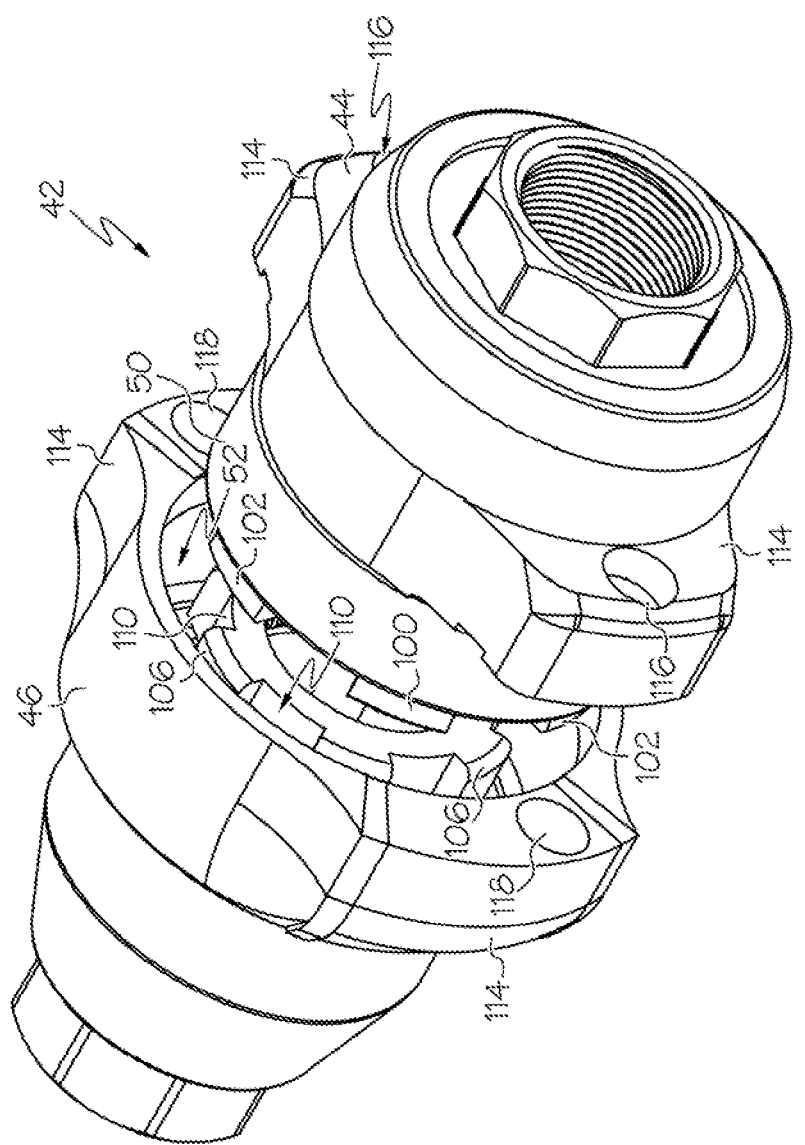
FIG. 7 is a front perspective view of the assembly of FIG. 2, shown in its disconnected configuration.

With reference to FIGS. 4 and 7, the first connector 44 may include a generally tubular or annular coupling portion 50, which can have a variety of shapes in cross section, and which is removably receivable in a socket 52 of the second connector 46. The second connector 46 further includes a poppet valve 54 positioned therein. The poppet valve 54 includes a body portion 56 having an upstream stem 58, a downstream stem 62, and sealing portion 64 coupled to the body portion 56. The upstream stem 58 is received in a guide 66 which is centered in the second connector 46 by a plurality of radially-extending fins 68. The poppet valve 54 further includes a spring 74 positioned between the guide 66 and the body portion 56. The body portion 56/poppet valve 54 is thereby biased, by the spring 74, to a closed position in which the sealing portion 64 sealingly engages the poppet valve seat 76 (see FIG. 8).

The first connector 44 may also include a poppet valve 80 positioned therein. The poppet valve 80 includes a body portion 82 having an upstream stem 84, a downstream stem 86, and sealing portion 88 coupled to the body portion 82. The downstream stem 86 is received in a guide 90 which is centered in the first connector 44 by a plurality of radially-extending fins 92. The poppet valve 80 further includes a spring 94 positioned between the guide 90 and the body portion 82. The body portion 82/poppet valve 80 is thereby biased, by the spring 94, to a closed position in which the sealing portion 88 sealingly engages the poppet valve seat 96 (see FIG. 8). In the embodiment of FIGS. 4-12, the downstream stem 62 of the poppet valve 54 includes a socket 98 configured to receive the tip of the upstream stem 84 of the poppet valve 80.

Figure 5:
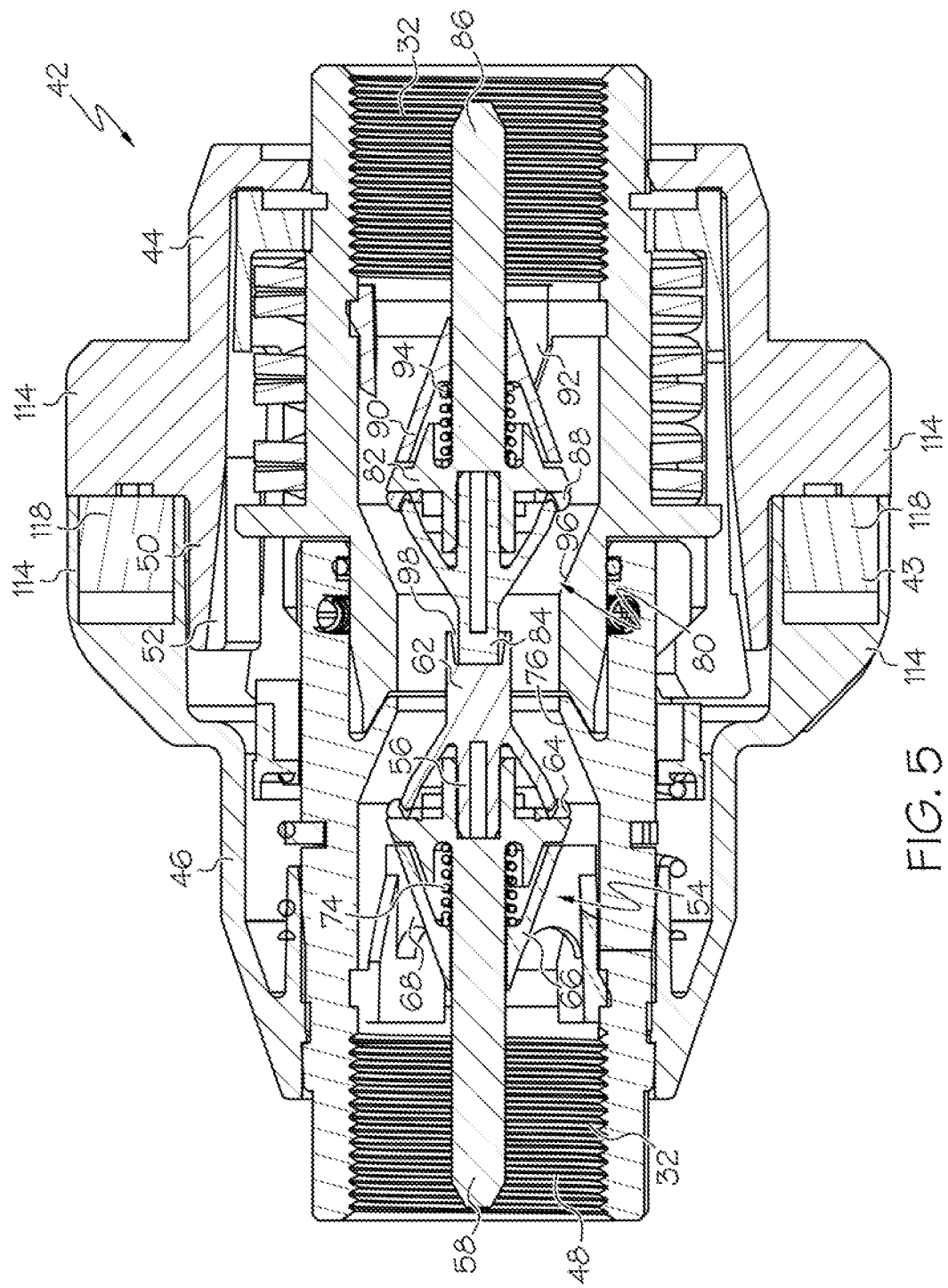
FIG. 5 is a side cross section taken along line 5-5 of FIG. 3.
Figure 6:
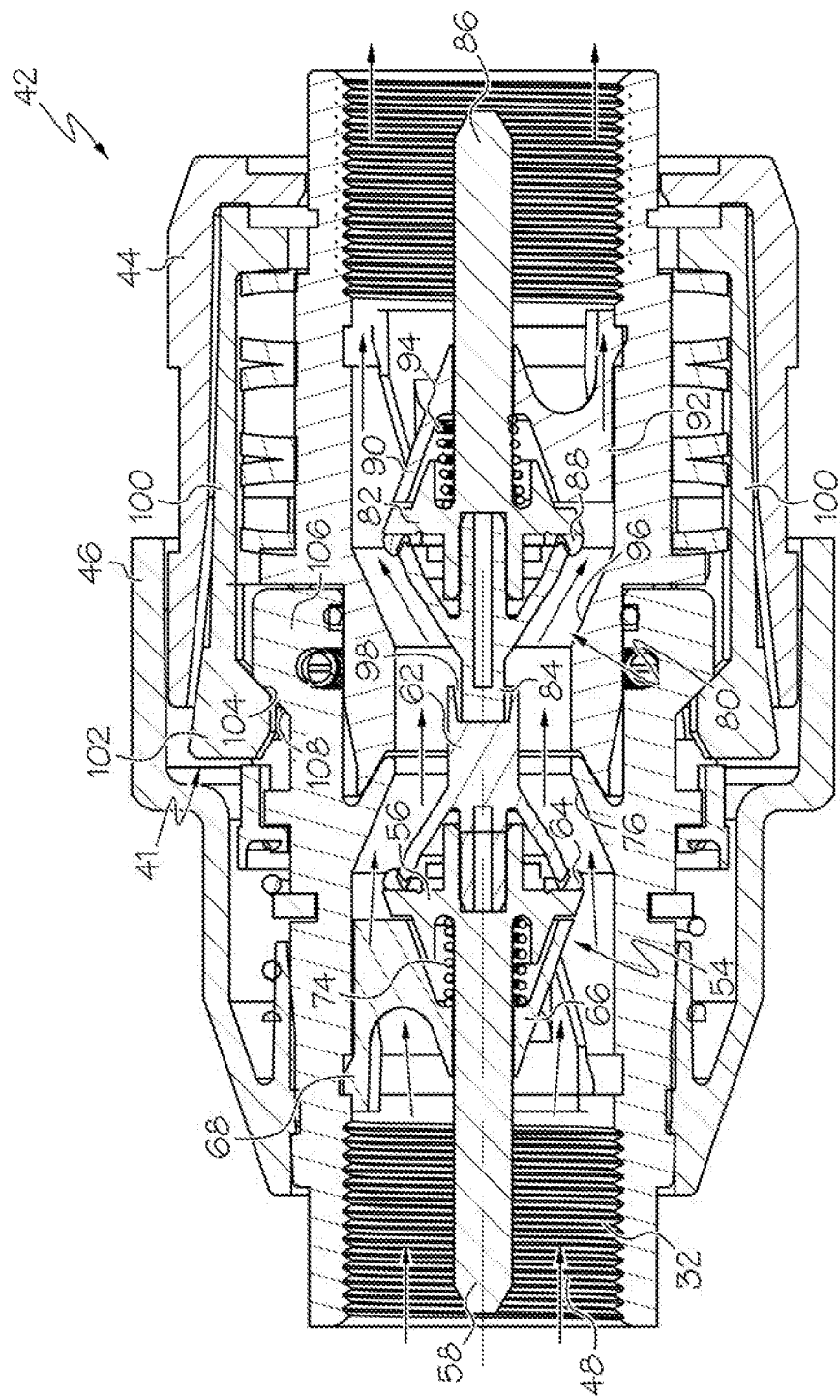
FIG. 6 is a side cross section taken along line 6-6 of FIG. 3.

During normal operation of a dispenser 12, the first connector 44 and second connector 46 are arranged in their first/locked/connected/engaged state or configuration, as shown in FIGS. 2-6, in which the first 44 and second 46 connectors are coupled together and define a fluid conduit, or fluid path 32 through which fluid may flow, as shown by the arrows of FIG. 6. The fluid conduit 32 enables a relatively high volume flow of fluid therethrough. The socket 98 of the poppet valve 54 receives the tip of the upstream stem 84 of the poppet valve 80. As will be described in greater detail below, a coupling mechanism 41 is provided to couple the connectors 44, 46 in the axial direction. In this manner, the springs 74, 94 of both poppet valves 54, 80 are compressed and both poppet valves 54, 80 are opened, wherein the seals 64, 88 are spaced away from their associated seats 76, 96, enabling fluid to flow through the fluid path 32/breakaway assembly 42/connectors 44, 46.

Figure 8:
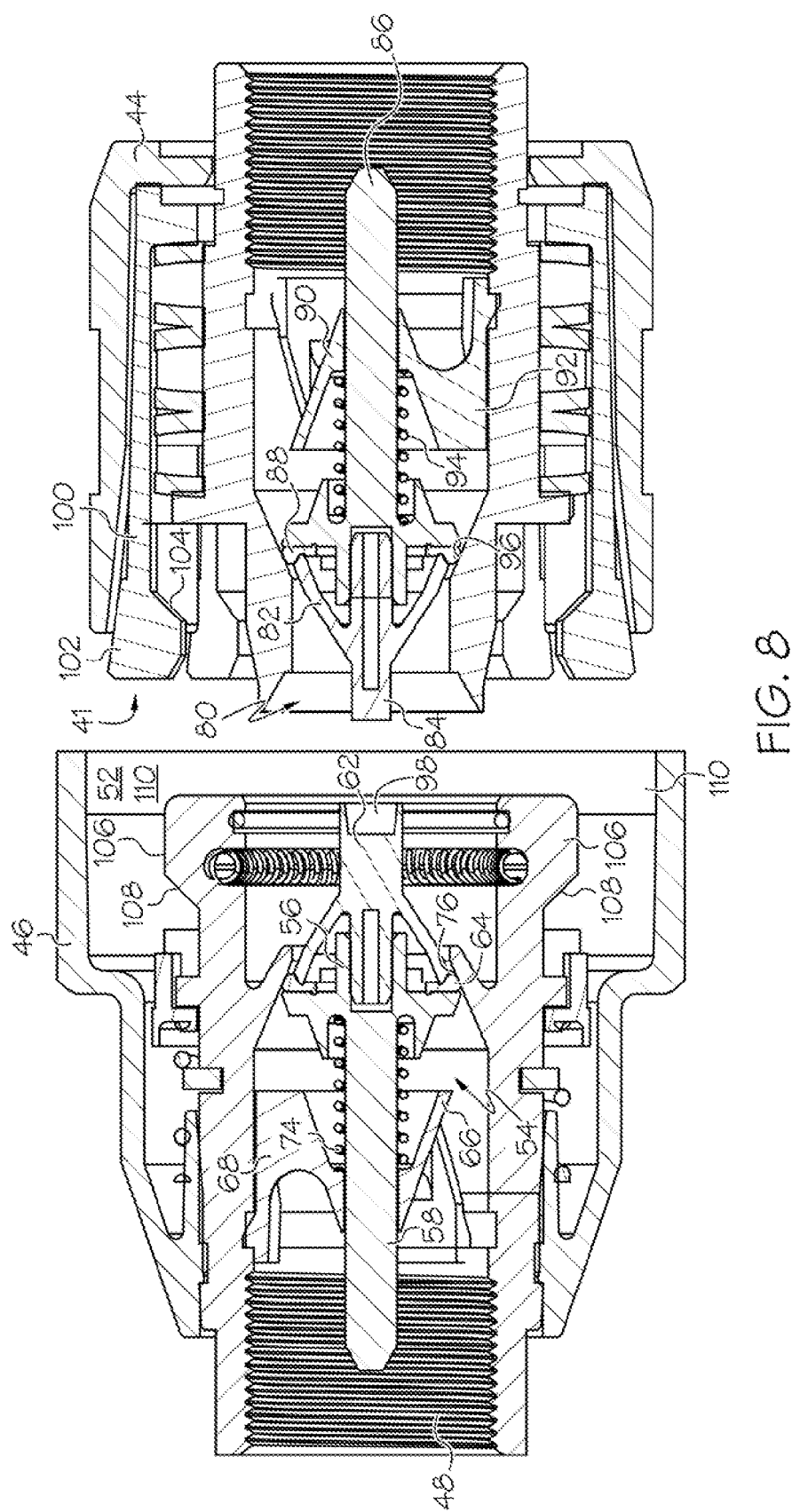
FIG. 8 is a side cross section of the assembly of FIG. 7.

When sufficient separation forces are applied to the assembly 42 (i.e. forces applied at least partially along the axis of the breakaway assembly 42/connector 44, 46), the breakaway assembly 42 moves to its second/separated/disconnected state or configuration as shown in FIGS. 7 and 8. When the connectors 44, 46 are moved away from each other, the upstream stem 84 of the poppet valve 80 is retracted and pulled away from the socket 98 of poppet valve 54. The relative movement of the connector(s) 44, 46 away from each other enables the poppet valves 54, 80 to move to their closed positions, as shown in FIGS. 7 and 8 in which the seals 64, 88 engage their associated poppet valve seats 76, 96, as biased by their associated springs 74, 94.

The assembly 42 may be reusable and may be configured such that the connectors 44, 46 are connectable/reconnectable (i.e. movable from the configuration of FIGS. 7 and 8 to that of FIGS. 2-6) without requiring any repair or replacement of any components of the assembly 42, as will be described in greater detail below. In particular, when the first connector 44 and second connector 46 are connected/reconnected, the downstream stem 62 of the poppet valve 54 receives the tip of the upstream stem 84 of the poppet valve 80. When sufficient axial compression forces are applied to the assembly 42 during the reconnection process, the body portions 56, 82 of the poppet valves 54, 80 are moved away from their respective poppet valve seats 76, 96 until the valves 54, 80 are in the position shown in FIGS. 4-6.

The assembly 42 may include a coupling mechanism 41 which physically/mechanically couples the connectors 44, 46 together to retain the assembly 42 in its coupled position until sufficient axial forces are applied. With reference to FIG. 6, the coupling mechanism 41 may include a plurality of axially-extending flanges 100 on the first connector 44, wherein each flange 100 is circumferentially spaced from any adjacent flanges 100. The number of flanges 100, their shape and material properties can be varied as desired to provide the desired characteristics to the coupling mechanism 41, and the flanges 100 can be made of various materials, including but not limited to metals or polymers. Each flange 100 may include a ramp-shaped locking tab 102 at its distal end and on its radially inner surface. Each locking tab 102 may have a surface 104 that is angled (i.e. extending at a non-parallel angle relative to the central axis) on its radially inner surface. Each flange 100 may be elastically deflectable in the radial direction (radially outwardly from the position shown in FIG. 6, in one case).

The coupling mechanism 41 may also include plurality of ramps 106 on the second connector 46, wherein each ramp 106 is circumferentially spaced from any adjacent ramp 106. Each ramp 106 may include an angled surface 108 thereon which, in one embodiment, generally corresponds to the angle of the surface 104 of each flange 100. The ramps 106 may define a set of axially-extending slots 110 (FIG. 7) therebetween. In one case, each slot 110 has a circumferential width at least equal to the circumferential width of each of the flanges 100.

Figure 11:
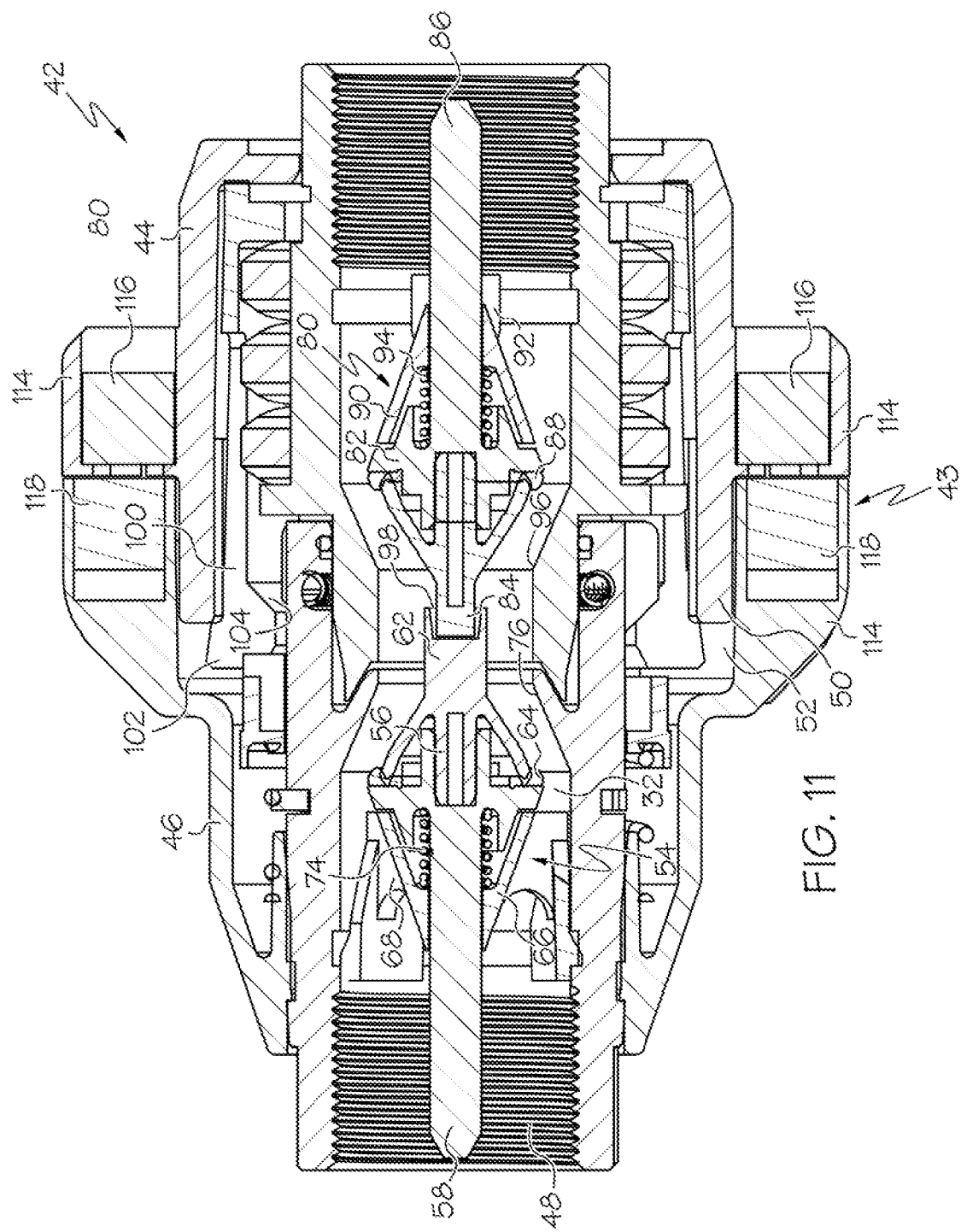
FIG. 11 is a side cross section taken along line 11-11 of FIG. 9.
Figure 12:
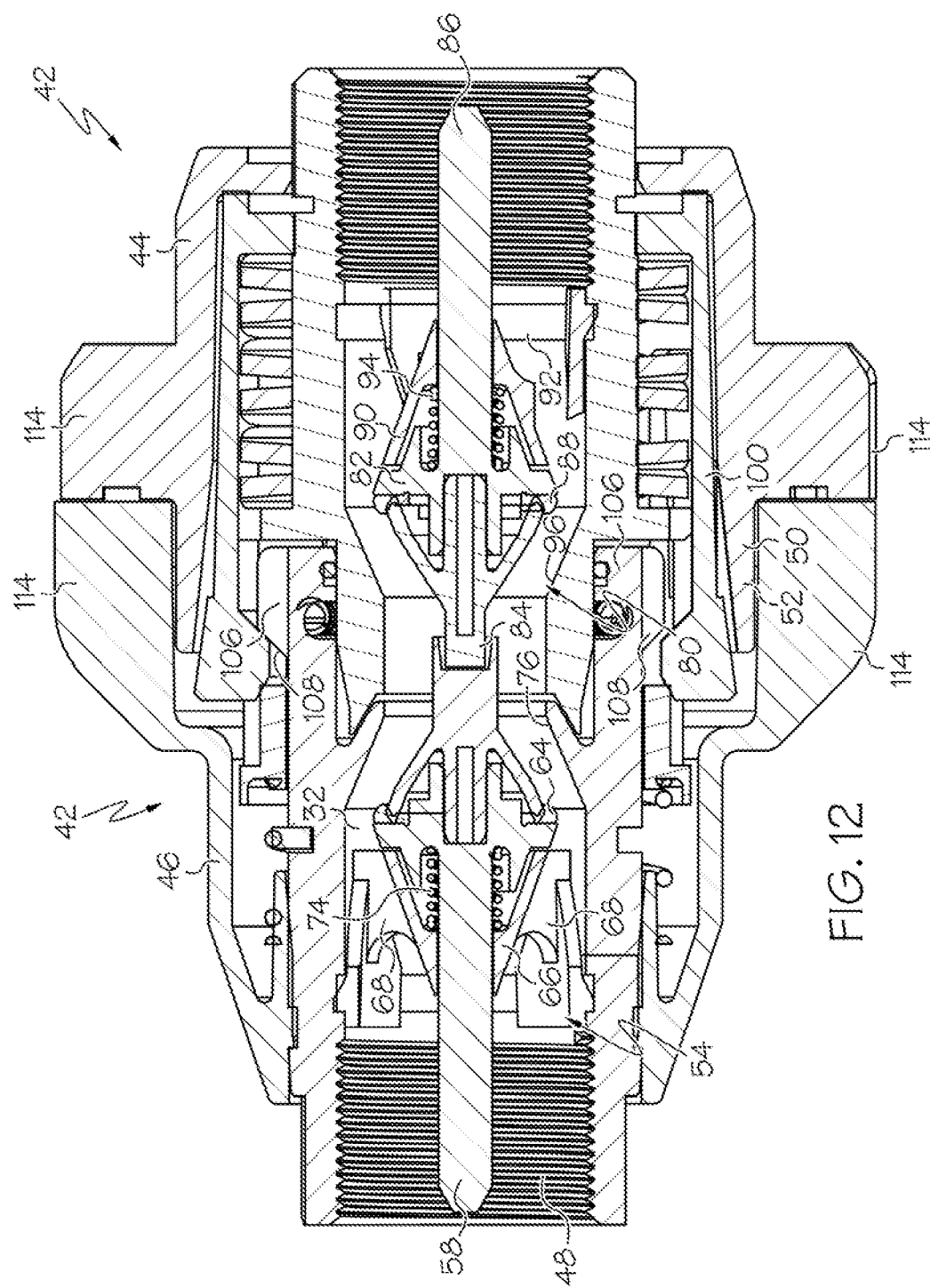
FIG. 12 is a side cross section taken along line 12-12 of FIG. 9.

In order the couple the connectors 44, 46 together and move the assembly 42 to its connected configuration, the connectors 44, 46 may begin spaced axially apart, in the configuration shown in FIGS. 7 and 8. The connectors 44, 46 are then aligned such that each flange 100/tab 102 of the first connector 44 is aligned with a slot 110 of the second connector 46, as shown in FIG. 7. The connectors 44, 46 are then axially moved together, sliding the flanges 100 into the slots 110. Upon sufficient axial movement the upstream stem 84 of poppet valve 80 engages the downstream stem 62 of poppet valve 54 which causes the poppet valves 54, 80 to open, as outlined above (see FIG. 11). In this state, the assembly 42/connectors 44, 46 can be considered to be in a first position relative to each other, or in a engaged, but unlocked, (or third) configuration. As shown in FIG. 11, in this configuration the flanges 100 are not aligned with the ramps 106.

In order to move the assembly 42 from the third configuration into its locked, connected or first configuration, one or both of the connector 44, 46 are then rotated or pivoted about the central axis, which causes the flanges 100 to be positioned adjacent to an associated ramp 106, causing the angled surfaces 104, 108 to be aligned (in a radial plane) and/or engage each other and/or positioned immediately adjacent to each other, as shown in FIG. 6. The rotation/pivoting can be seen in comparing FIG. 9 to FIG. 2 (and FIG. 11 with FIG. 6). The amount of rotation/pivoting can vary, but is between about 15° and about 45° in one case. In this state (i.e. that of FIGS. 2-6), the connectors 44, 46 can be considered to be in a second position relative to each other.

Figure 13:
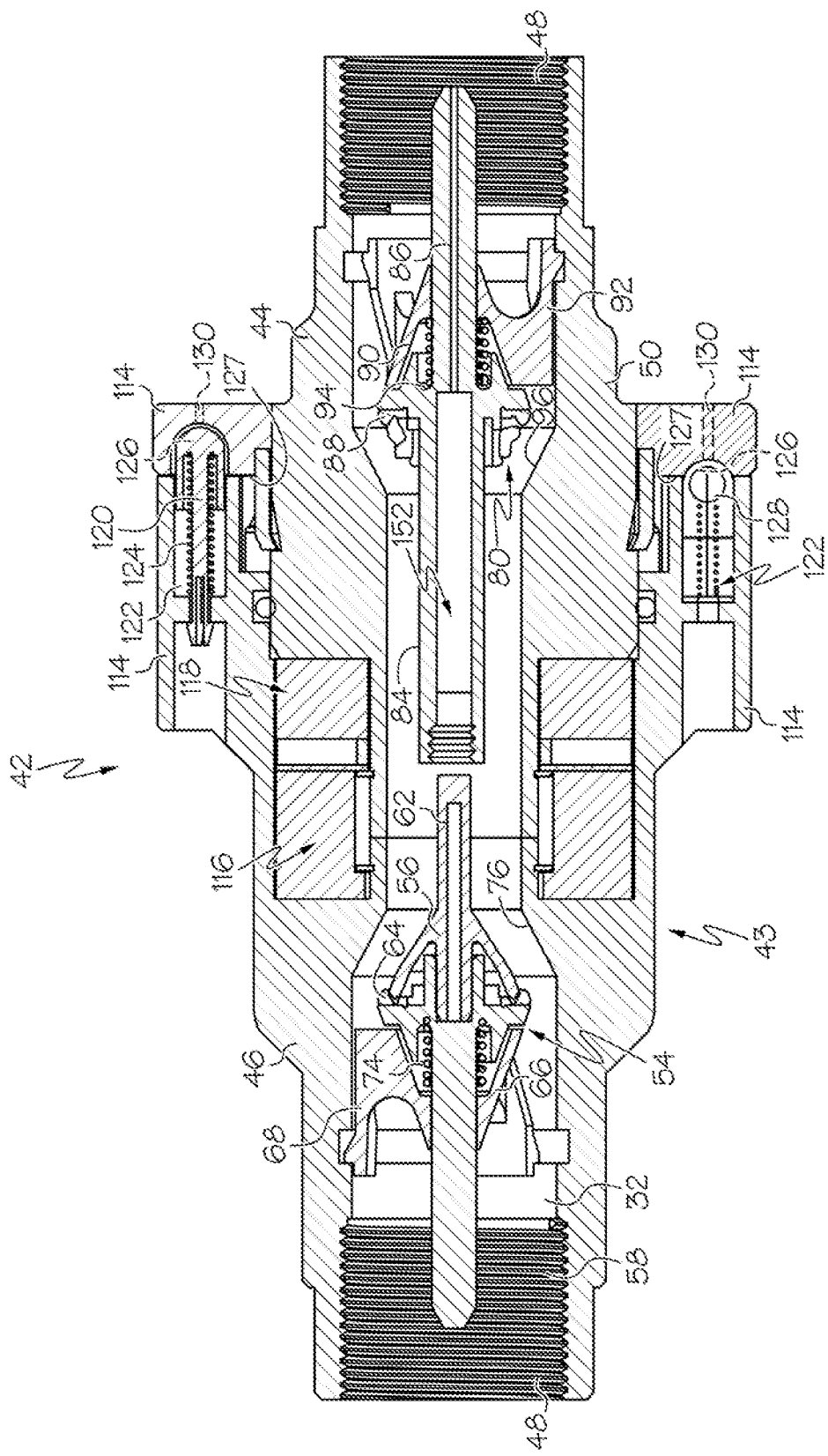
FIG. 13 is a side cross section of another embodiment of a breakaway assembly, shown in its connected configuration.

The assembly 42 may include various locking arrangements to cause the connectors 44, 46 to remain in the first or connected configuration and be prevented from pivoting back to the third (engaged but unlocked) configuration. In particular as shown in FIG. 13, in one case one of the connectors (the second connector 46 in the illustrated embodiment) includes a spring-biased protrusion or pin 120 (shown in the top portion of FIG. 13). The pin 120 is movable in the axial direction in a pin opening 122 positioned in the connector 46, and biased by a spring 124 positioned in the pin opening 122, in an axial, downstream direction. The other connector (the first connector 44 in the illustrated embodiment) includes a recess or opening 126 that is alignable with the pin 120.

When the assembly 42 is moved from the disconnected (second) configuration to the engaged, but unlocked (third) configuration, the pin 120 may be misaligned with the associated opening 126 and therefore the pin 120 is pressed into its retracted position in the pin opening 122 by the axial end face 127 of the ear 114 of connector 44, compressing the spring 124. When assembly 42 is twisted and moved into the connected (first) configuration, the opening 126 becomes aligned with the pin 120, and the pin 120 springs axially forwardly such that the in 120 is received in the opening 126. In this manner the pin 120 rotationally locks the assembly/connectors 44, 46 in place.

If desired, more than one pins 120 may be used; in one case two pins 120 located 180 degrees opposite to each other may be utilized. Moreover, various other locking arrangements besides pins may be utilized. For example, the locking arrangement shown in the bottom portion of FIG. 13 uses a ball 128 that is spring biased into the corresponding opening 126 of the connector 44, and operates in a manner analogous to the pin 120. In addition, the position of the pins, balls, or other protrusion, and associated openings, can be reversed. For example, in the illustrated embodiment the pins 122/balls 128 can be positioned on the connector 44, and the openings 126 positioned on the connector 46.

In some cases, provisions may be made to enable the locking arrangements to be released to enable the connectors 44, 46 to pivot from the connected configuration to the engaged, but unlocked, configuration. In particular, in one case relatively small, axially-extending openings 130 may extend through the ears 114 of the connector 44 to the downstream surface thereof. A thin rod or rods may be passable through the openings 130 to engage the pin 120/ball 128 and axially move the pin 120/ball 128 to their retracted positions, thereby enabling the assembly 42 to move to the engaged but unlocked configuration. In one case, a specialized tool, including the rods having the appropriate size, spacing and configuration, may be utilized to simultaneously retract all of the protrusions 120, 128, etc.

When the assembly is in the connected configuration shown in FIGS. 2-6, the angled surfaces 104, 108 frictionally engage each other and/or form an interference arrangement to resist axial forces that would otherwise cause the assembly 42 to move to its disconnected or separated condition. When sufficient axial separation forces are applied to the first connector 44 and/or second connector 46, the angled surfaces 104, 108 slide along each other, causing the flanges 100 to be urged radially outwardly. Sufficient radially outward deflection of the flanges 100 causes the angled surfaces 104, 108 to slide by each other in the axial direction, and the first connector 44 is pulled away from the second connector 46, thereby moving the assembly 42 to its disconnected configuration shown in FIGS. 7 and 8. The desired separation force can vary according to the needs of the end-user, but one case is between about 100 and about 400 lbs., and is about 285 lbs. in one case.

As noted above, the breakaway assembly 42 can also be manually connectable/reconnectable. In particular, the connectors 44, 46 can be reattached by sliding the flanges 100 into the slots 110, and then twisting the connectors 44, 46 so that each flange 100 is aligned with a ramp 106. In this manner the breakaway assembly 42 can be connectable/reconnectable without requiring the repair or replacement of any parts, as no parts are destroyed or damaged during normal separation. The re-connectible configuration also enables the breakaway assembly 42 to be tested prior to shipping, in contrast to non reconnectable, one-time use breakaway assemblies which cannot be tested as easily.

It should also be understood that the coupling mechanism can take any of a wide variety of forms besides the flanges 100/ramps 106 shown herein and described above. For example, the coupling mechanism can utilize locking jaws or the like, as disclosed in U.S. patent application Ser. No. 13/303,604, entitled Ball and Socket Breakaway Connector, filed on Nov. 23, 2011, the entire contents of which are hereby incorporated by reference. The breakaway assembly 42 can also take the form of a pressure balanced breakaway assembly, or a semi-pressure balanced breakaway assembly, in which case the coupling mechanism utilizes pressure generated by the flow of fluid to provide the entire or partial anti-separation force. Various other coupling mechanisms can also be utilized.

The illustrated embodiment shows both the first 44 and second 46 connectors having poppet valves 54, 80 therein. However, in one embodiment, only one of the connectors 44, 46 has a poppet valve. In this case, the other connector 44, 46, lacking a poppet valve, may include a hold-open stand, analogous to the portions 62/84, which extends axially forwardly and can engage the poppet valve in the other connector and urge the poppet valve to the open position when the assembly 42 is in its connected configuration. In addition, when the assembly 42 is used with dispensing systems utilizing vapor recovery systems, one or both of the connectors 44, 46 may include poppet valves in the vapor recovery path which are opened when the assembly 42 is in the connected configuration, and which automatically close when the assembly 42 moves to the disconnected position. Examples of these arrangements are disclosed in U.S. patent application Ser. No. 13/303,604, mentioned above and incorporated by reference herein.

Figure 9:
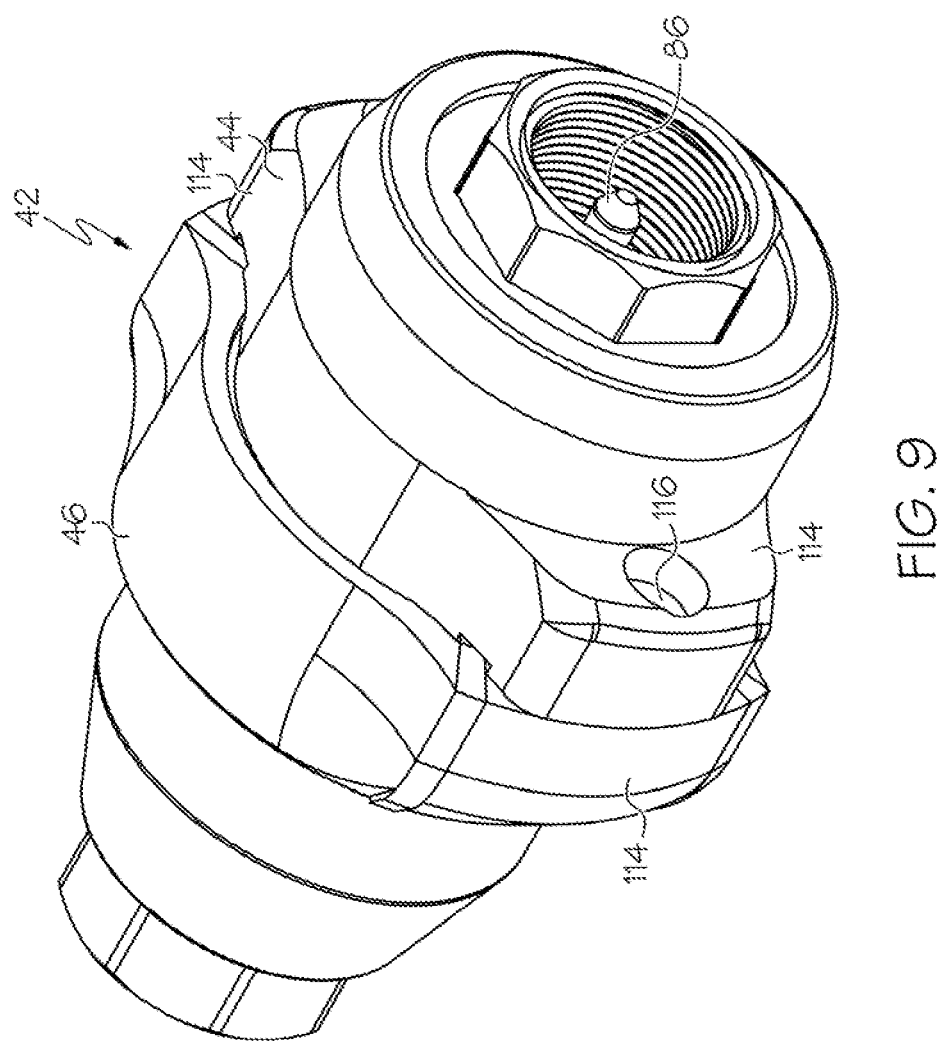
FIG. 9 is a front perspective view of the assembly of FIG. 2, shown in its engaged but unlocked configuration.
Figure 10:
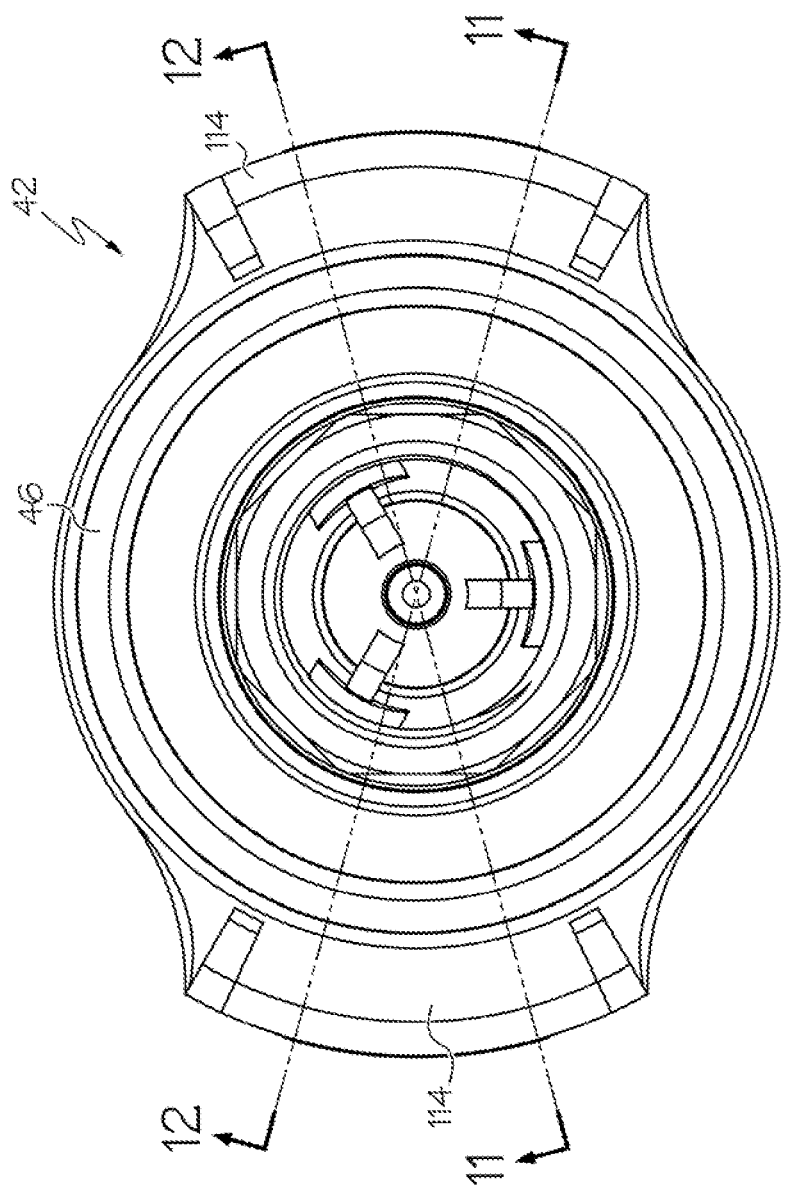
FIG. 10 is a top view of the breakaway assembly of FIG. 9.

The assembly 42 may include magnet unit 43 coupled to at least one of the first 44 or second 46 connectors. The magnet unit 43 can include a magnet that is magnetically attractable to at least part of the other one of the first 44 and second 46 connectors to provide a magnetic assist feature to a user moving the assembly 42 to the connected and/or engaged but unlocked configuration, and more particularly in one case, from the disconnected configuration to the engaged but unlocked configuration. In the illustrated embodiment and as best shown in FIG. 7 the first connector 44 and second connector 46 may each include a pair of radially outwardly extending, opposed ears 114. The ears 114 are configured to be positioned adjacent to the each other when the assembly 42 is in the connected configuration (FIG. 2) or the engaged (but unlocked) configuration (FIG. 9). It should be understood that rather than utilizing one more ears 114, each connector 44, 46 could instead utilize a radially outwardly extending flange or other surface that extends circumferentially around the entire (or nearly the entire) connector 44, 46.

The ears 114 of the first connector 44 have a magnet 116 carried thereon, as shown in FIG. 4, which can be part of the magnet unit 43, adjacent to an axial end surface thereof. As shown in FIG. 5, the ears 114 of the second connector 46 may have a magnet and/or a magnetizable material (including ferrous metals), such as a strike plate 118, which can be part of the magnet unit 43, carried thereon and adjacent to an axial end surface thereof.

When the connectors 44, 46 are in the configuration shown in FIGS. 7 and 8, the flanges 100 are aligned with the slots 110, as outlined above, to enable the connectors 44, 46 to axially engage each other. In addition, in this configuration each magnet 116 is axially aligned with an associated strike plate 118. In particular, in one case at least part of a magnet 116 overlaps with at least part of an associated strike plate 118 when viewed in the end (axial) direction. In this manner, when the connectors 44, 46 are moved from the disconnected configuration to the engaged (but unlocked) configuration, as shown in FIG. 11, the magnets 116 and strike plates 118 are aligned and magnetically attracted, and provide a force pulling the connectors 44, 46 together that correspondingly reduces the amount of manual force required to move the connectors 44, 46 to the engaged (but unlocked) configuration.

As outlined above, when the connectors 44, 46 are moved from the disconnected configuration to the engaged configuration, the springs 74, 94 of the poppet valves 54, 80 need to be compressed, which requires a certain force. In addition, one or both of the poppet valve 54, 80 may resist movement due their open positions due to static liquid pressure behind the poppet valve 54, 80 during reconnection, which in one case can range from about 0 psi to about 50 psi. Moreover, the connectors 44, 46 may frictionally engage each other when moved to the engaged configuration and/or seals may be compressed, which provides additional force that may need to be overcome. In one case, for example, the assembly 42 requires a connective force of at least about 30 lbs. in one case, or at least about 40 lbs. in another case, to move the assembly 42/connectors 44, 46 to the engaged position. The magnets 116/strike plates 118 can provide an attractive/engagement force of at least about 10 lbs., or at least about 20 lbs., or at least about 30 lbs., or at least about 40 lbs., or less than about 100 lbs., or less than about 90 lbs. Thus, in one case the magnet unit 43/magnets 116/strike plates 118 can provide an attractive/engagement force of at least about 25%, or at least about 50%, or at least about 75%, or at least about 100% of the connective force.

As outlined above, once the assembly 42 and connectors 44/46 are in the engaged but unlocked configuration (FIGS. 9-12), the connectors 44, 46 are twisted relative to each other to move the assembly 42 and connectors 44/46 to the connected configuration when the assembly 42 can be axially separated when the separation force is applied. When the assembly 42 and connectors 44/46 are moved to the connected configuration, the magnets 116 and strike plates 118 become misaligned such that, in one case, at least part of a magnet 116 no longer overlaps with at least part of an associated strike plate 118 when viewed in the end (axial) direction, or no part of any magnet 116 overlaps with any associated strike plate 118 when viewed in the axial direction. Thus, in this configuration, as shown in FIGS. 4 and 5, since the magnets 116 are misaligned with the strike plates 118, the magnets 116 may not contribute to the separation force, or may contribute relatively little to the separation force. While the magnets 116 may still be somewhat magnetically attracted to the strike plates 118 and/or may be magnetically attracted to the ears 114 of the connectors 44/46 or other components thereof, the magnetic attraction force may be reduced by at least about 25%, or at least about 50%, or at least about 75% as compared to when the assembly 42 is in the engaged but unlocked configuration. In addition, the magnets 116/strike plates 118 may provide less than about 50% in one case, or less than about 25% in another case, of the separation force when the assembly 42 is in the connected configuration and/or contribute less than about 100 lbs., or less than about 90 lbs., or less than about 30 lbs., or less than about 5 lbs., or less than about 1 lb. to the separation force.

Reducing or effectively eliminating the magnetic attraction between the connector 44, 46 when the assembly 42 is in the locked configuration might provide a more predictable and consistent separation force. In addition, by misaligning the magnets 116 and strike plates 118 when the assembly 42 is in the connected configuration, the magnets 116 and strike plates 118 are spaced apart and avoid rusting together in a manner which can adversely affect the separation force, and which can make service and maintenance difficult.

The twisting force required to move the assembly 42 from the engaged position to the locked position may be resisted somewhat by the magnetic attraction between the magnets 116 and the strike plates 118. However, since the movement between the connectors 44/46 is a twisting/shear force that is normal to the plane of the magnets 116/strike plates 118, the force required to circumferentially move/twist the connectors 44, 46 is less than the force required to axially move/separate the connectors 44, 46 when in the engaged, but unlocked, configuration. In this manner, the magnets 116/strike plates 118 provide an assist feature that aids in connecting the connectors 44, 46, but the retarding force applied by the magnets 116/strike plates 118 against twisting the connectors 44, 46, is less than the assist force. In one case, the amount the magnets 116/strike plates 118 contribute to the separation force (when the assembly 42 is in the connected configuration) is less than about 25% of the assist force (the force assisting the assembly 42 to move from the disconnected configuration to the engaged but unlocked configuration).

However, it should be understood that the assembly 42 can take on various of the shapes and configurations beyond those shown and described herein, including those in which the magnets 116/strike plates 118 do not become misaligned, and/or where no twisting is required to move the connectors 44, 46 to the locked position (e.g. in this case the assembly 42 may only have a connected and a disconnected configuration, and may lack an engaged (but unlocked) configuration). For example, in one case the magnets and strike plates may extend 360 degrees continuously (or nearly continuously) around the connectors 44, 46. In this case, the magnets and strike plates may still provide a magnetic assist feature, and be used in conjunction with the flanges/ramps or other locking arrangement. In other words, in this case the magnets and strike plates may not solely provide the connection features/disconnection force.

In yet another case, a series of magnets and strike plates may extend circumferentially around (or nearly around) the entire associated connector 44, 46. In this case (or other cases described herein) the magnets and strike plates may be received in a cover that protects and covers the magnets/strike plates, and ensures that they are properly positioned. The magnets and/or strike plates can have various shapes, such as annular or doughnut shaped, cylindrical, flat plates, etc. The magnets and/or strike plates can also be positioned radially inside the outer walls of the connectors 44, 46 as shown, for example, in FIG. 13.

In the embodiments outlined above, the magnets 116 are carried on the first connector 44 and the strike plates 118 are carried on the second connector 46. However, this configuration may be reversed in that the magnets 116 may be carried on the second connector 46 and the strike plates 118 may be carried on the first connector 44. Further alternately, the first connector 44 may include both magnets and strike plates, as may the second connector 46. In addition, each strike plate 118 could be made of a magnet arranged to be magnetically attracted to an associated magnet on the other connector when properly aligned. Further alternately, a connector may entirely lack a discrete strike plate, and the entire connector, or portions thereof, can be made of a ferrous metals or magnetized material that can be magnetically attracted to the magnets on the other component. It should be understood that the magnets 116 can be made of any of a wide variety of materials, including permanently magnetized materials such as rare earth magnets. The magnets 116 and/or strike plates 118 can be plated, coated, encapsulated or unplated.

The magnets 116 may also take the form of electromagnets that are selectively magnetizable based upon the flow of electrical current from a current source. The current source can take the form of a battery, or a standard power grid, etc. In this case the electromagnets could, in one case, be selectively activated during the reconnection process to aid in reconnection, and then turned off so that the separation force is not reliant upon electrical power.

In some of the embodiments described above, the magnets 116 and/or strike plates 118 are fixedly coupled to their associated connectors 44, 46, and the magnets/strike plates are moved into or out of alignment by relative rotation between the connectors 44, 46. Alternately, however, the magnets 116 and/or strike plates 118 can be movably mounted to the associated connector 44, 46. In this case, for example, the magnets 116/strike plates 118 may be aligned when the connectors 44, 46 are initially coupled to provide a magnetic assist feature. The magnets 116 and/or strike plates 118 could then be moved to a misaligned position by moving at least one of the magnets 116 and/or strike plates 118, such as by an operator turning a dial or otherwise operating an actuator, to "turn off" or reduce the magnetic attraction. The magnetic force can be "turned on" or increase by causing the alignment of the magnets 116/strike plates 118. Further alternately, rather than having the magnets 116/strike plates 118 aligned during initial coupling of the connectors 44, 46, the magnets 116/strike plates 118 may be misaligned during initial coupling, and movable into an aligned configuration after the connectors 44, 46 are initially or fully coupled.

As noted above, reconnection of the connectors 44, 46 can, in some cases, be difficult due to high static pressure in the fluid paths 32. In other words, when the assembly 42 is in its disconnected configuration and the poppet valves 54, 80 are closed, the poppet valves 54, 80 can trap fluid therebehind having a relatively high static pressure. Such static pressure can provide resistance to opening of the poppet valves 54, 80, since any attempted opening of the poppet valves 54, 80, would further pressurize the trapped fluid.

Figure 14:
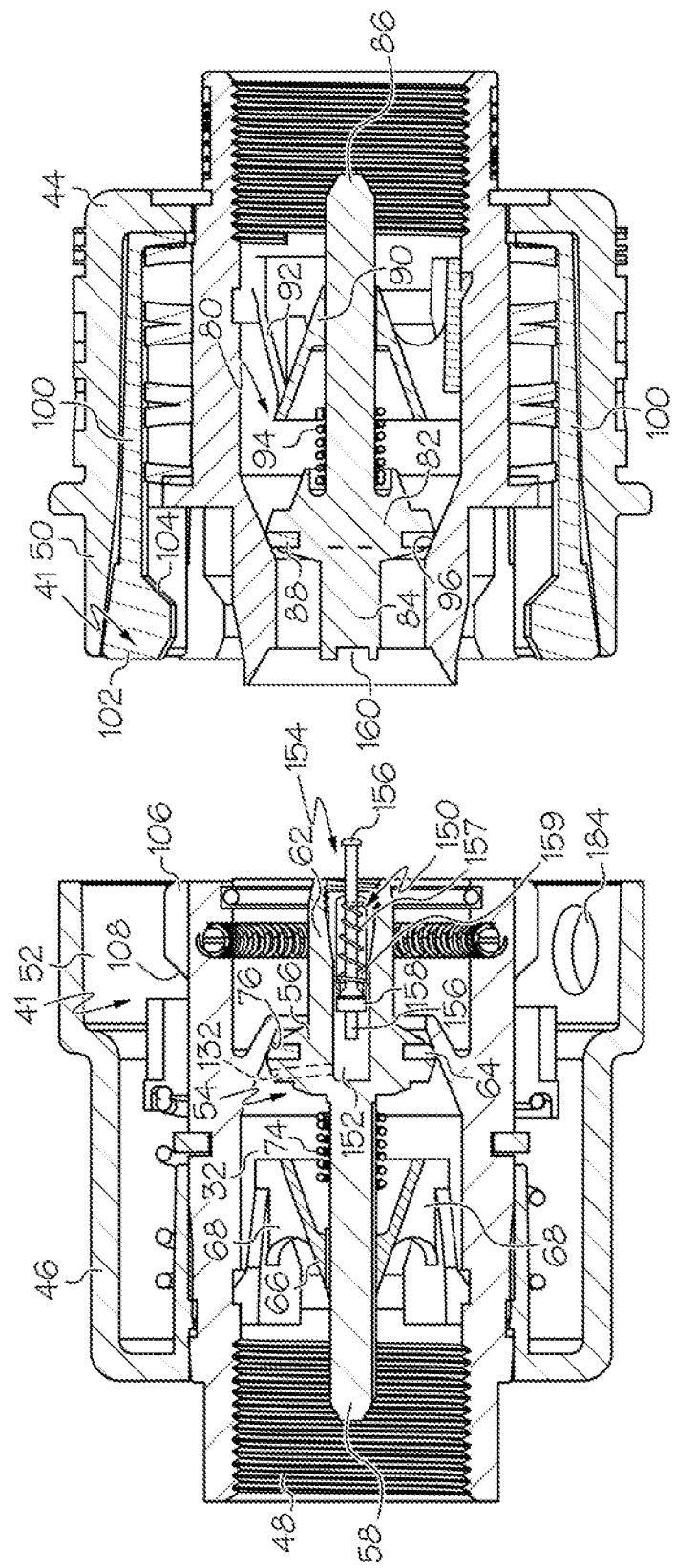
FIG. 14 is a side cross section of another embodiment of a breakaway assembly, with a pressure relief functionality, shown in its disconnected configuration.
Figure 15:
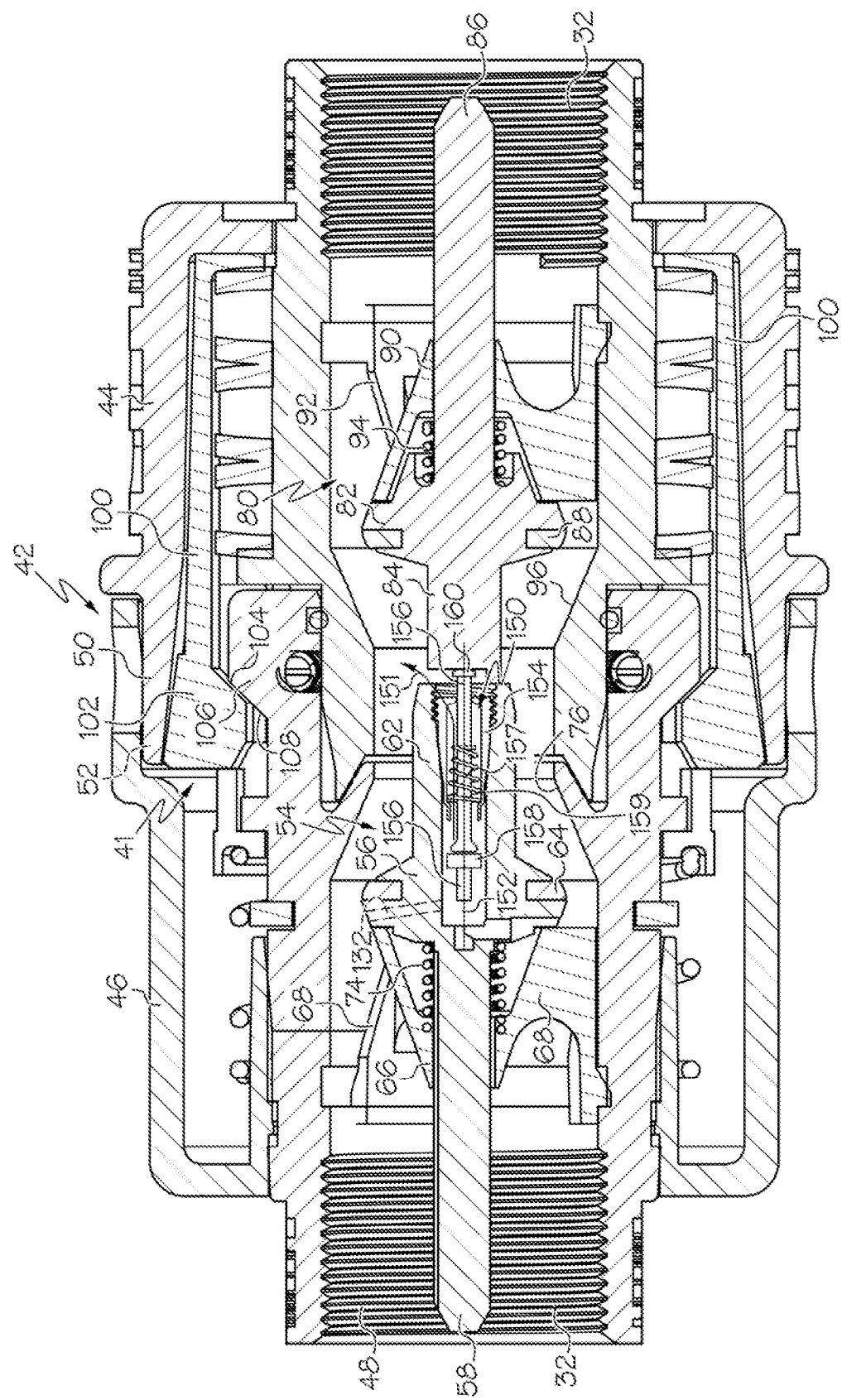
FIG. 15 shows the breakaway assembly of FIG. 14 in its connected configuration.

In one embodiment the assembly 42 includes a pressure relief or valve bleed arrangement, generally designated 150 and shown in FIGS. 14 and 15, to provide ease of connection/reconnection. The valve bleed arrangement 150 includes a bleed path 152 in the second connector 46, extending through the poppet valve 54 (in one case), and in fluid communication with the fluid path 32 (via schematically illustrated fluid conduit 132) in the illustrated embodiment. A bleed valve 154 is positioned in the bleed path 152, such as by being threaded in place in the illustrated embodiment.

The bleed valve 154 includes a bleed plunger 156 that carries a seal 158 thereon. The bleed valve 154/bleed plunger 156 is, in one embodiment, biased by bleed spring, 157 into a closed or sealed position, such as when the assembly 42 is in the disconnected configuration (FIG. 14). When the bleed valve 154/bleed plunger 156 is in its closed position, the seal 158 is seated against the bleed valve body and prevents fluid from flowing through the bleed path 152. The bleed valve 154 may also include fluid passages 159 therein/therethrough that are in fluid communication with the bleed path 152 when the bleed valve 154 is open.

In the illustrated embodiment the bleed valve 154 is concentrically positioned in the poppet valve 54. However, the bleed valve 154 need not be concentrically positioned in the poppet valve 54, and indeed may not even be positioned in or coupled to the poppet valve 54. Instead, the bleed valve 154 can be positioned in nearly any location in which the bleed valve 154 can allow at least some fluid trapped by said poppet valve 54 to escape to reduce a pressure of the fluid trapped by the poppet valve 54, as will be described in greater detail below.

The upstream stem 84 of the first connector 44 can include recess 160 configured to receive a downstream end of the bleed plunger 156 therein. As shown in FIG. 15, the bleed plunger 156 is configured such that when the assembly 42 is in or approaches the engaged but unlocked configuration, the upstream stem 84 of the first connector 44 engages the bleed plunger 156, bottoming out in the recess 160, which moves the bleed valve 154/bleed plunger 156 to its open position. The recess 160 provides a feature to help ensure the bleed valve 154 is opened at the appropriate time/position, but can be omitted if desired. In any case, when the bleed valve 154 is moved to its open position, the bleed seal 158 is moved away from its seat and the bleed spring 157 is compressed, allowing some fluid in the fluid path 32 to escape via the fluid conduit 132, bleed path 142 and opened bleed valve 154. In particular, fluid can flow through the internal passages 159 in the bleed valve 154 and exit the fluid path 32/connector 46, as shown by arrow 151 of FIG. 15.

When the bleed valve 154 is thus opened, the fluid pressure/static pressure behind the bleed valve 154 and poppet valve 54 is reduced, and the connection/reconnection force for the assembly 42 is reduced. In other words, the reduction of pressure in the fluid path 32 makes it easier to move the body portion 56 upstream to open the poppet valve 54, since the body portion 56 moves against a reduced pressure. Although opening the bleed valve 154 may cause a slight loss of fluid from the fluid path 32, the fluid loss is small and typically contained internally within the assembly 42.

The upstream stem 84 is configured to engage the bleed plunger 156, and the bleed valve 154 is configured to be open, before the poppet valve 54 and/or poppet valve 80 is opened, to provide the ease-of-opening benefits outlined above. Once the bleed valve 154 is opened, continued axial movement of the connectors 44, 46 toward each other will open the poppet valves 54, 80, in the manner outlined above. The bleed valve 154 is thus, in the illustrated embodiment, automatically opened when the assembly 42 is connected/reconnected. In some cases, however, the bleed valve 154 may be able to be separately actuated, such as by manually actuated the bleed valve 154, before and/or during connection/reconnection.

Although the bleed valve 154 is shown as a valve with an actuable plunger 156 having a seal 158 carried thereon, the bleed valve 154 can utilize or take the form of various other valve arrangements, such as a Dill valve, Schrader valve, spring loaded balls, spring loaded plunger of various shapes (cones, cylinders, spheres, etc.), a flapper valve, duck bill valve, etc. The bleed valve 154/bleed plunger 156 may have a smaller surface area (exposed to upstream/pressurized fluid) than the poppet valve 54. This enables the bleed valve 154 to be opened with a smaller force than that required to open the poppet valve 54, which in turn provides a pressure reduction that enables the poppet valve 54 to be opened with a smaller force. The bleed valve 154/bleed plunger 156 may have an effective surface area, exposed to pressurized fluid, that is less than about 50%, or less than about 25%, of the effective surface area of the poppet valve 54 exposed to pressurized fluid.

If desired, one or both of the poppet valves 54, 80, may incorporate a bleed arrangement to decrease the reconnection force. However, in many cases the static pressure of the upstream poppet 54 may be higher, particularly since the fluid pump 24 can increase the static pressure, and therefore a bleed valve or pressure relief arrangement 150 may in some cases be more beneficial in the upstream connector 46. In the case where only one of the connectors 44, 46 includes a poppet valve, the bleed valve actuator can take the form of a rigid pin coupled to the other connector (analogous to the upstream stem 84 in the embodiment of FIGS. 14 and 15). The bleed arrangement can be utilized in assemblies in which the connectors 44, 46 are movable from the disconnected configuration to the connected configuration merely by moving the connectors together in the axial direction (i.e. assemblies which lack the engaged but unlocked (third) configuration), but can also be utilized in assemblies in which the connectors 44, 46 are movable from the disconnected configuration to the connected configuration by moving the connectors together in the axial direction and then twisting (i.e. assemblies which utilize the third configuration, as described herein), or in various other types of assemblies.

Figure 16:
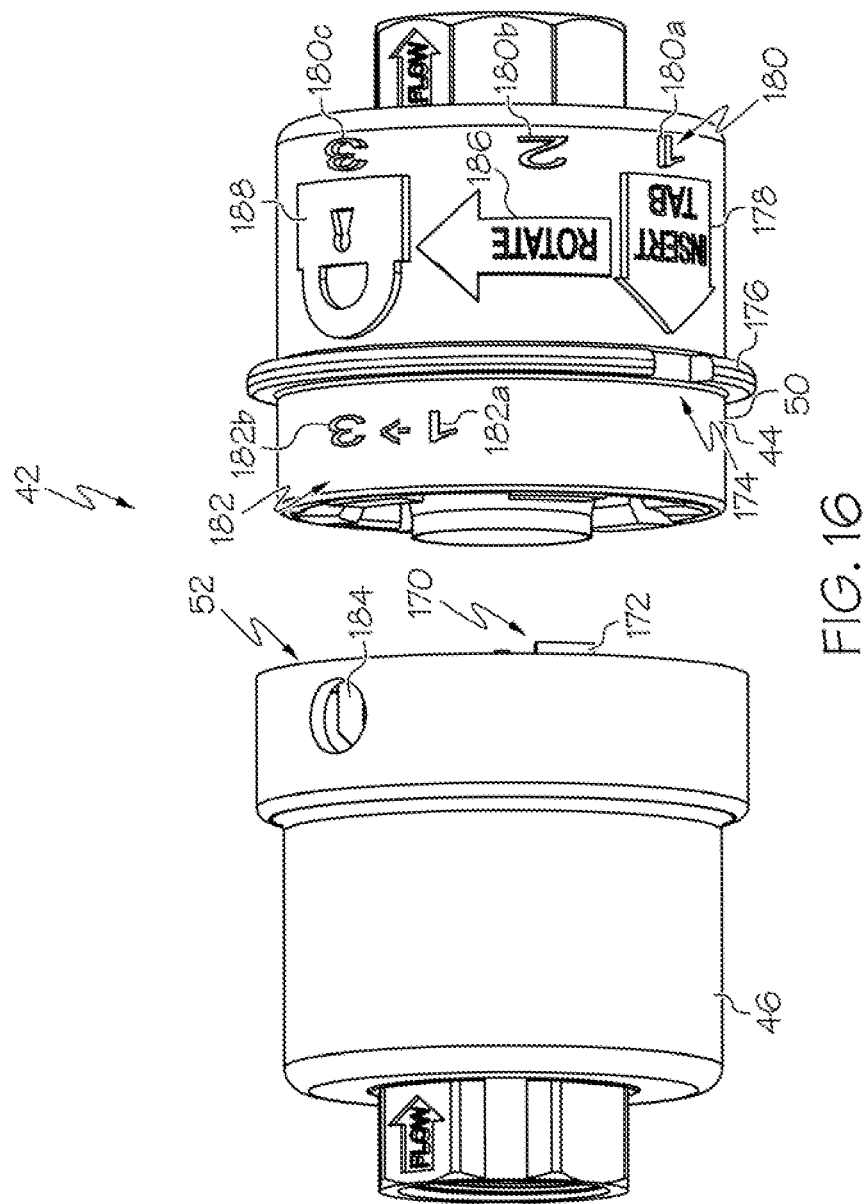
FIG. 16 is a front perspective view of a breakaway assembly in a disconnected configuration.
Figure 17:
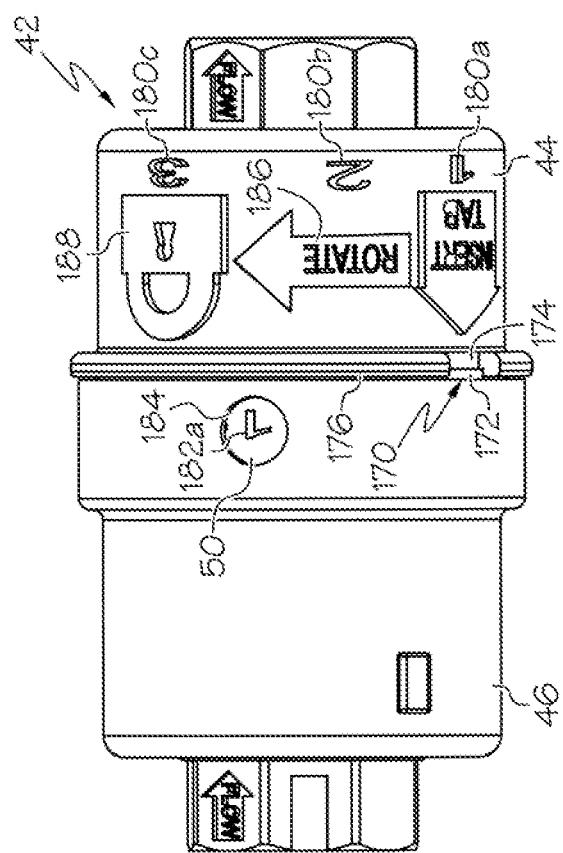
FIG. 17 is a side view of the breakaway assembly of FIG. 16, in its engaged but unlocked configuration.

The assembly 42 can also include various feature to aid a user in connecting, or reconnecting, the connectors 44, 46. For example, as shown in FIG. 16, in one embodiment the assembly 42 can include a connector guide 170 which helps ensure that the connectors 44, 46 can only be connected in one, or a predefined number, of relative rotational positions. In the embodiment shown in FIG. 16, the connector guide 170 includes or takes the form of an axially-extending tab 172 at a circumferentially outer position of connector 46, and a groove 174 formed in an outer rib 176 of connector 44. The tab 172, groove 174 and outer rib 176 are configured such that the connectors 44, 46 can only be coupled together when the tab 172 is received in the groove 174, as shown in FIG. 17.

In this manner the tab 172 and groove 174 can be configured such that the connectors 44, 46 can only be axially coupled when each flange 100 of the first connector 44 is aligned with a slot 110 of the second connector 46, as outlined above and shown in FIG. 7. In the illustrated embodiment, the outer rib 176 includes only a single groove 174. However, in some cases, the outer rib 176 can include a plurality of grooves 174 formed therein, such that the tab 172 (or multiple tabs 172, if desired) can be received in any of a number of discrete positions. The top portion of the rib 176 can include a circular groove formed therein (not shown) to allow the tab 172 to move rotationally in the rib 176, when the tab 172 is properly positioned. The circular groove thus allows the assembly 42 to move from the engaged but unlocked configuration to the coupled configuration.

The first connector 44 (which can also be termed the male connector 44) can include various indicia printed, embossed, debossed, adhered, or otherwise carried thereon to serve as a visual aid to a user in connection/reconnection of the assembly 42. For example, with reference to FIG. 16 connector 44 includes positioning or alignment or insertion indicia 178 that is aligned with the groove 174 and/or tab 172. In the illustrated embodiment the alignment indicia 178 takes the form of an axially-extending arrow pointing at the groove 174 and the text "INSERT TAB," but could also take the form of various other images, symbols and/or text (including text in other languages) that conveys the same or similar meaning The alignment indicia 178 thus shows where the tab 172 should be inserted into the groove 174/connector 44.

The first connector 44 may also include a first set of number or ordered indicia 180 associated with, and/or positioned adjacent to, the alignment indicia 178. In the illustrated embodiment, the first set of number indicia 180 includes indicia 180a associated with the alignment indicia 178 in the form of a number "1," since the insertion of the tab 172 is the first step in the connection process.

The connector 44 can also include a second set of number or ordered indicia 182 positioned on the coupling portion 50 of the connector 44. In the illustrated embodiment, the second set of number indicia 182 includes indicia 182a that is the same as, or corresponds to, the indicia 180a (e.g. the number "1").

The second connector 46 includes an opening 184 formed therethrough at a distal end thereof. As shown in FIG. 17, when the connectors 44, 46 are axially moved toward each other and are in the engaged but unlocked configuration, the opening 184 is aligned with the second number indicia 182a such that the second number indicia 182a is visible through the opening 184 (i.e. the number "1" is visible through the opening 184). In this manner, the assembly 42 provides feedback to the user that the first step in the connection/reconnection process has been completed.

The connector 46 can also include rotational indicia 186 carried thereon, positioned adjacent to the alignment indicia 178. In the illustrated embodiment the rotational indicia 186 takes the form of a circumferentially-extending arrow and the text "ROTATE," but could also take the form of various other images, symbols and/or text (including text in other languages) that conveys the same or similar meaning The rotational indicia 186 thus cues a user as to how the connector 44 and/or 46 should be rotated relative to each other to couple/lock the connectors 44, 46. The first set of number indicia 180 includes number indicia 180b, in the form of a number "2," positioned adjacent to and/or associated with the rotational indicia 186 to cue a user that rotation is the second step in connecting/reconnecting the assembly 42.

The connector 46 can also include lock indicia 188 carried thereon, positioned adjacent to the rotational indicia 186. In the illustrated embodiment the lock indicia 188 take the form of an image of a lock such as a padlock, but could also take the form of various other images, symbols and/or text that conveys the same or similar meaning. The lock indicia 188 thus conveys to a user that the connectors 44/46 are fully coupled and in a locked position (i.e. the connected configuration). The first set of number indicia 180 includes number indicia 180c, in the form of a number "3," positioned adjacent to and/or associated with the lock indicia 188 to cue a user that locking is the third step in connecting/reconnecting the assembly 42.

The second set of number indicia 182 includes number indicia 182b, in the form of a number "3" in the illustrated embodiment. When the assembly 42 is in the fully connected position, as shown in FIG. 18, the opening 184 is aligned with the second number indicia 182b such that the second number indicia 182b is visible through the opening 184 (i.e. the number "3" is visible through the opening 184). In this manner, the assembly 42 provides feedback to the user that the third step in the connection/reconnection process has been completed, and the assembly is locked.

In addition, when the assembly 42 is in the locked configuration shown in FIG. 18, the number indicia 182a (e.g. the number "1") is covered by the connector 46, not aligned with the opening 184 and thus not visible. In this manner the user knows that the assembly 42 is not in the first step of the connection process. Conversely, after the first step of the connection process has been completed (FIG. 17), the number indicia 182b (e.g. the number "3") is covered by the connector 46, not aligned with the opening 184 and not visible, so the user knows that the assembly 42 is not in the third step of the connection process.

It should be understood that it may be possible to reverse the position of some or all of the indicia 178, 180, 182, 186, 188 such that the indicia 178, 180, 182, 186, 188 is positioned on the connector 46 instead of connector 44. In addition, it should be understood that rather than using numbers, other ordered indicia, such as letters, alphanumeric characters or the like can be used as the indicia 180 and/or 182. In addition, rather than the use of numbers, other indicia which conveys the same or similar meaning can be utilized. For example, when the assembly 42 is in its engaged but unlocked position, a red-colored patch may be visible through the opening 184, and when assembly 42 is in its connected or locked configuration a green-colored patch may be visible through the opening 184. When the assembly 42 is in its engaged but unlocked position, the green-colored patch may be covered and not visible, and when assembly 42 is in its connected or locked configuration the red-colored patch may be covered and not visible.

Thus, the various indicia 178, 180, 182, 186, 188 provides connection instructions or directions in an intuitive, easy-to-understand and visual manner to aid a user in the connection/reconnection process. In addition, in some cases the assembly 42 may provide tactile feedback when the assembly 42 is moved into its locked position, such as when a pin 120 or ball 128 (FIG. 13) snaps into place, and/or when the flanges 100 are properly positioned. This provides additional feedback/guidance to a user.

In this manner it can be seen that the assembly described herein provides various benefits. The assembly can utilize a magnetic assist feature that can reduce or in some cases entirely eliminate the reconnection force. The pressure bleed/relief feature can be utilized to reduce reconnection force. In addition, the assembly may utilize easy and intuitive indica to cue a user in connection/reconnection steps. The assembly thus may be able to be reconnected by users with no particular training or expertise, and without requiring high arm strength, which can enable untrained users to reconnect the assembly and reduce the need for service calls.

Having described the invention in detail and by reference to certain embodiments, it will be apparent that modifications and variations thereof are possible without departing from the scope of the invention.

What is claimed is:

1. A breakaway assembly comprising:
a first connector;
a second connector that is releasably coupleable to said first connector, wherein said assembly is movable between a first configuration in which said first and second connectors are coupled and together define a fluid path through which fluid is flowable, and a second configuration in which said first and second connectors are axially separated, wherein said assembly is configured to move from said first configuration to said second configuration when a sufficient separation force is applied to said assembly, and wherein said assembly is configured to be moved from said second configuration to said first configuration when a sufficient connecting force is applied to said assembly;
a closure valve positioned in one of said first or second connectors, wherein said closure valve is configured to be in an open position when said assembly is in said first configuration to allow fluid to flow therethrough, and to be in a closed position when said assembly is in said second configuration to generally block the flow of fluid therethrough, said closure valve including a closure valve spring biasing said closure valve; and
a bleed valve configured to allow at least some fluid trapped by said closure valve to escape to reduce a pressure of said fluid trapped by said closure valve, said bleed valve including a bleed valve spring biasing said bleed valve, wherein said bleed valve is configured to be automatically opened to allow at least some fluid trapped by said closure valve to escape as said assembly is moved from said second configuration to said first configuration.

2. The assembly of claim 1 wherein said bleed valve is configured to be automatically opened to allow at least some fluid trapped by said closure valve to escape as said assembly is moved from said second configuration to said first configuration but before said closure valve is moved to said open position.

3. The assembly of claim 1 wherein said bleed valve is configured to allow fluid to flow therethrough in order to allow fluid trapped by said closure valve to escape.

4. The assembly of claim 1 wherein said bleed valve is separately actuable relative to said closure valve.

5. The assembly of claim 1 wherein said bleed valve is concentrically positioned in said closure valve.

6. The assembly of claim 1 wherein said bleed valve is spring biased to a closed position and is positioned on one of said first or second connectors, and wherein the other one of said first or second connectors includes a projection configured to engage said bleed valve and open said bleed valve as said assembly is moved from said second configuration to said first configuration.

7. The assembly of claim 1 wherein said bleed valve is directly manually operable.

8. The assembly of claim 1 wherein said bleed valve is positioned in an upstream one of said connectors with respect to the direction of fluid flow, and wherein pressurized fluid is trapped by said closure valve.

9. The assembly of claim 8 wherein said bleed valve is has a smaller surface area exposed to pressurized fluid in said assembly than said closure valve.

10. The assembly of claim 1 wherein said bleed valve is openable with a lesser force than a force required to open said closure valve.

11. The assembly of claim 1 wherein said assembly is configured to be manually movable from said second configuration to said first configuration.

12. The assembly of claim 1 wherein said assembly is configurable in a third configuration in which said closure valve is in said open position and said first and second connectors are not securely coupled, and wherein said assembly is arranged such that said assembly must be configured in said third configuration at least temporarily as said assembly is moved from said second configuration to said first configuration, and wherein said bleed valve is configured to allow fluid to flow therethrough as said assembly is moved from said first configuration to said third configuration but before said assembly is in said third configuration.

13. The assembly of claim 1 wherein said assembly is configured to move from said second configuration to said first configuration by first axially moving said first and second connectors together until they engage each other, and then rotating at least one of said first and second connectors relative to the other.

14. The assembly of claim 1 wherein said assembly is reconnectable such that said assembly is movable between said first and second configurations without having to replace any components thereof.

15. The assembly of claim 1 wherein said first and second connectors are configured to be mechanically coupled together by a coupling mechanism.

16. The assembly of claim 15 wherein said coupling mechanism includes an angled surface on said first connector and an angled surface on said second connector, and wherein said angled surfaces are configured to frictionally engage each other to retain said assembly in said first configuration until said sufficient separation force is applied to said assembly.

17. The assembly of claim 16 wherein each angled surface extends discontinuously around the associated connector.

18. The assembly of claim 16 wherein said coupling mechanism includes a plurality of spaced apart angled surfaces, each such angled surface of one of said connectors being carried on an associated flange that is configured to be deflected radially outwardly upon the application of said sufficient separation force to allow said assembly to be moved from said first configuration to said second configuration.

19. The assembly of claim 18 wherein each flange is coupled to said one of said connectors, and wherein the other one of said connectors includes a set of axially-extending grooves, and wherein said assembly is configured to move from said second configuration to said first configuration by inserting said flanges into said grooves, and then rotating at least one of said first or second connectors relative to the other one to cause said angled surfaces of said first and second connectors to engage each other.

20. The assembly of claim 1 wherein said closure valve includes a poppet positioned in said one of said first or second connectors, said poppet being spring biased to said closed position, and wherein the other one of said first or second connectors includes an extension which engages said poppet to retain said poppet in said open position when said assembly is in said first configuration.

21. The assembly of claim 1 wherein one of said first and second connectors is fluidly coupled to a fuel dispensing nozzle for dispensing fuel into an automobile fuel tank, and wherein the other one of said first and second connectors is fluidly coupled to a fuel pump.

22. The assembly of claim 1 wherein said closure valve spring biases said closure valve closed and wherein said bleed valve spring biases said bleed valve closed.

23. The assembly of claim 1 wherein said bleed valve spring applies a smaller spring force than a spring force applied by said closure valve spring.

24. The assembly of claim 1 wherein the other one of said first or second connectors does not include a bleed valve, and wherein said one of said first or second connectors is positioned upstream relative to the other one of said first or second connectors relative to a flow of fluid through said assembly.

25. The assembly of claim 1 wherein said closure valve spring is positioned in one of said first or second connectors when said assembly is in said second configured, and wherein said bleed valve spring is positioned in the other one of said first or second connectors when said assembly is in said second configuration.

26. The assembly of claim 1 wherein said closure valve includes a closure valve spring biasing said closure valve and wherein said valve arrangement includes a bleed valve spring biasing a bleed valve.

27. A breakaway assembly comprising:
a first connector;
a second connector releasably coupleable to said first connector, wherein said assembly is movable between a first configuration in which said first and second connectors are releasably coupled and together define a fluid path through which fluid is flowable, and a second configuration in which said first and second connectors are axially separated and not coupled together, wherein said assembly is configured to move from said first configuration to said second configuration when a sufficient separation force is applied to said assembly;
a closure valve positioned in one of said first or second connectors, wherein said closure valve is configured to be in an open position when said assembly is in said first configuration to allow fluid to flow therethrough, and to move to a closed position when said assembly moves to said second configuration to generally block the flow of fluid therethrough; and
a bleed valve arrangement configured to allow fluid to flow through or bypass said closure valve to reduce pressure and aid in moving said assembly to said first configuration, wherein said bleed valve arrangement, when unpressurized, is configured to be opened with a smaller force than a force required to open the closure valve, when unpressurized, and wherein said bleed valve arrangement is configured to be automatically opened to allow at least some fluid trapped by said closure valve to escape as said assembly is moved from said second configuration to said first configuration.

28. A method for connecting a breakaway assembly comprising:
accessing a breakaway assembly including a first connector and a second connector that is releasably coupleable to said first connector, wherein said assembly is movable between a first configuration in which said first and second connectors are coupled and together define a fluid path through which fluid is flowable, and a second configuration in which said first and second connectors are axially separated, wherein said assembly is configured to move from said first configuration to said second configuration when a sufficient separation force is applied to said assembly, and wherein said assembly is configured to be moved from said second configuration to said first configuration when properly positioned and a sufficient connecting force is applied to said assembly, the assembly including a closure valve positioned in one of said first or second connectors, wherein said closure valve is configured to be in an open position when said assembly is in said first configuration to allow fluid to flow therethrough, and to be in a closed position when said assembly is in said second configuration to generally block the flow of fluid therethrough, said closure valve including a closure valve spring biasing said closure valve, the assembly further including a bleed valve having a bleed valve spring biasing said bleed valve; and
bringing said first and second connectors together to cause said bleed valve to allow fluid trapped by said closure valve to escape as said assembly is moved from said second configuration to said first configuration.

29. The method of claim 28 wherein said bringing together step reduces a pressure of fluid trapped by said closure valve to increase ease of moving said assembly from said second configuration to said first configuration, and wherein the method further includes applying a connecting force to said assembly to cause said assembly to move from said second configuration to said first configuration.

30. A breakaway assembly comprising:
a first connector;
a second connector that is releasably coupleable to said first connector, wherein said assembly is movable between a first configuration in which said first and second connectors are coupled and together define a fluid path through which fluid is flowable, and a second configuration in which said first and second connectors are axially separated, wherein said assembly is configured to move from said first configuration to said second configuration when a sufficient separation force is applied to said assembly, and wherein said assembly is configured to be moved from said second configuration to said first configuration when a sufficient connecting force is applied to said assembly, and wherein said assembly is reconnectable such that said assembly is movable between said first and second configurations without having to replace any components thereof;
a closure valve positioned in one of said first or second connectors, wherein said closure valve is configured to be in an open position when said assembly is in said first configuration to allow fluid to flow therethrough, and to be in a closed position when said assembly is in said second configuration to generally block the flow of fluid therethrough, said closure valve including a closure valve biasing element biasing said closure valve; and
a bleed valve configured to allow at least some fluid trapped by said closure valve to escape to reduce a pressure of said fluid trapped by said closure valve, said bleed valve including a bleed valve biasing element biasing said bleed valve and wherein said assembly is reconnected such that said assembly is movable between said first and second configurations without having to replace any components thereof.

* * * * *